US011445102B2

(12) United States Patent
Nakatsuka

(10) Patent No.: US 11,445,102 B2
(45) Date of Patent: Sep. 13, 2022

(54) INFORMATION PROCESSING DEVICE AND INFORMATION PROCESSING METHOD

(71) Applicant: SONY CORPORATION, Tokyo (JP)

(72) Inventor: Shigeo Nakatsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,681

(22) PCT Filed: Jul. 31, 2019

(86) PCT No.: PCT/JP2019/030032
§ 371 (c)(1),
(2) Date: Feb. 18, 2021

(87) PCT Pub. No.: WO2020/044924
PCT Pub. Date: Mar. 5, 2020

(65) Prior Publication Data
US 2021/0195090 A1    Jun. 24, 2021

(30) Foreign Application Priority Data

Aug. 31, 2018  (JP) .............................. JP2018-163105

(51) Int. Cl.
*H04N 5/232* (2006.01)
(52) U.S. Cl.
CPC ..... *H04N 5/23206* (2013.01); *H04N 5/23216* (2013.01); *H04N 5/232935* (2018.08); *H04N 5/232939* (2018.08)

(58) Field of Classification Search
CPC ......... H04N 5/23206; H04N 5/232935; H04N 5/232939; H04N 5/23216; H04N 5/232933; H04N 5/23299; H04N 5/23218
See application file for complete search history.

(56) References Cited

U.S. PATENT DOCUMENTS

| | | | | |
|---|---|---|---|---|
| 9,426,408 | B2* | 8/2016 | Nikara | H04N 5/23216 |
| 10,051,179 | B2* | 8/2018 | Liu | H04N 5/23222 |
| 10,055,847 | B2* | 8/2018 | Johansson | G06T 7/20 |
| 10,447,919 | B2* | 10/2019 | Kanda | H04N 5/23296 |
| 10,477,093 | B2* | 11/2019 | Hong | G06V 10/25 |
| 10,587,809 | B2* | 3/2020 | Haneda | H04N 5/23293 |
| 2011/0115932 | A1 | 5/2011 | Shin et al. | |

(Continued)

FOREIGN PATENT DOCUMENTS

| | | |
|---|---|---|
| AU | 2015319023 A1 | 2/2017 |
| CN | 102065220 A | 5/2011 |

(Continued)

OTHER PUBLICATIONS

Extended European Search Report of EP Application No. 19855597.1 dated Sep. 23, 2021, 08 pages.

(Continued)

*Primary Examiner* — Pritham D Prabhakher
(74) *Attorney, Agent, or Firm* — Chip Law Group

(57) ABSTRACT

An information processing device is connected to an image-capturing device via a network, in which a mark indicating image-capturing timing in an image-capturing scene is set on the basis of: a captured image of a scene similar to the image-capturing scene, the captured image being transmitted via the network; and a live view image corresponding to the captured image.

19 Claims, 17 Drawing Sheets

(56) References Cited

U.S. PATENT DOCUMENTS

| | | |
|---|---|---|
| 2011/0222725 A1 | 9/2011 | Mitsushio et al. |
| 2015/0222845 A1 | 8/2015 | Nikara et al. |
| 2016/0080633 A1 | 3/2016 | Hong et al. |
| 2017/0111574 A1 | 4/2017 | Miyashita |
| 2017/0126965 A1* | 5/2017 | Liu ................... H04N 5/23216 |
| 2017/0169560 A1* | 6/2017 | Johansson ................ G06T 7/20 |
| 2017/0366743 A1* | 12/2017 | Park ..................... G06F 3/0484 |
| 2018/0262686 A1* | 9/2018 | Haneda ............. H04N 5/23216 |
| 2018/0270412 A1* | 9/2018 | Kanda ................ H04N 5/23216 |

FOREIGN PATENT DOCUMENTS

| | | | |
|---|---|---|---|
| CN | 104737526 A | | 6/2015 |
| CN | 105306801 A | | 2/2016 |
| CN | 106464784 A | | 2/2017 |
| CN | 106605236 A | | 4/2017 |
| CN | 106874829 A | | 6/2017 |
| EP | 2334050 A2 | | 6/2011 |
| EP | 2367151 A2 | | 9/2011 |
| EP | 2888871 A1 | | 7/2015 |
| EP | 3154252 A1 | | 4/2017 |
| EP | 3179406 A1 | | 6/2017 |
| EP | 3195589 A1 | | 7/2017 |
| JP | 2005-215373 A | | 8/2005 |
| JP | 2011-109657 A | | 6/2011 |
| JP | 2011-211678 A | | 10/2011 |
| JP | 2012-099984 A | | 5/2012 |
| JP | 2014-116878 A | | 6/2014 |
| JP | 2016-174259 A | | 9/2016 |
| JP | 2017-525193 A | | 8/2017 |
| JP | 6325643 B2 | | 5/2018 |
| JP | 6518409 B2 | | 5/2019 |
| KR | 10-2011-0053191 A | | 5/2011 |
| KR | 10-2016-0031900 A | | 3/2016 |
| KR | 10-2017-0002598 A | | 1/2017 |
| KR | 10-2017-0069937 A | | 6/2017 |
| TW | 201721583 A | | 6/2017 |
| WO | 2011/059246 A2 | | 5/2011 |
| WO | 2014/033347 A1 | | 3/2014 |
| WO | 2015/188466 A1 | | 12/2015 |
| WO | 2016/002355 A1 | | 1/2016 |
| WO | 2016/043423 A1 | | 3/2016 |

OTHER PUBLICATIONS

International Search Report and Written Opinion of PCT Application No. PCT/JP2019/030032, dated Nov. 5, 2019, 10 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/030032 filed on Jul. 31, 2019, which claims priority benefit of Japanese Patent Application No. JP 2018-163105 filed in the Japan Patent Office on Aug. 31, 2018. Each of the above-referenced applications is hereby incorporated herein by reference in its entirety.

TECHNICAL FIELD

The present technology relates to an information processing device, an information processing method, and an information processing program.

BACKGROUND ART

In the related art, there is a proposed camera system in which a camera that captures still images and moving images and a terminal device that controls the camera are connected by a network. Such a camera system has advantages of being capable of performing image-capturing operation from a remote location, capable of performing image-capturing even in a case where a person can hardly directly reach an image-capturing position while holding the camera, and the like.

However, in such a camera system, a live view motion picture transmitted from the camera to the terminal device is displayed on the terminal device in a manner delayed from an actual event that is an image-capturing object. Factors of such a delay include, for example, a time required for motion picture encoding by the camera, a network transmission time, a time required for decoding in the terminal device, and the like.

Considering this, there is a proposed method in which a motion picture that is delayed by an amount of a shutter time lag is displayed in a manner superimposed on an OVF in order to grasp the delay (shutter time lag) between the OVF inside the camera and a photograph actually captured (Patent Document 1).

CITATION LIST

Patent Document

Patent Document 1: Japanese Patent Application Laid-Open No. 2012-99984

SUMMARY OF THE INVENTION

Problems to be Solved by the Invention

According to a method of Patent Document 1, a shutter time lag is required to be known in advance, and therefore, the method is not applicable to a camera system in which the shutter time lag is unknown. Furthermore, since a motion picture that can be viewed during image-capturing is an OVF having no delay, the problem is not solved in a camera system as described above in which only a motion picture with a delay is viewable.

The present technology is made in consideration of such points, and is directed to providing an information processing device, an information processing method, and an information processing program which are capable of capturing an image of a scene desired by a user while watching a live view even though the live view is delayed.

Solutions to Problems

To solve the above-described problems, a first technology is an information processing device connected to an image-capturing device via a network, in which a mark indicating image-capturing timing in an image-capturing scene is set on the basis of: a captured image of a scene similar to the image-capturing scene, the captured image being transmitted via the network; and a live view image corresponding to the captured image.

Furthermore, a second technology is an information processing method including setting a mark indicating image-capturing timing in an image-capturing scene on the basis of: a captured image of a scene similar to the image-capturing scene, the captured image being transmitted via the network connected to an image-capturing device; and a live view image corresponding to the captured image.

Furthermore, a third technology is an information processing program causing a computer to execute an information processing method including setting a mark indicating image-capturing timing in an image-capturing scene on the basis of: a captured image of a scene similar to the image-capturing scene, the captured image being transmitted via the network connected to an image-capturing device; and a live view image corresponding to the captured image.

Effects of the Invention

According to the present technology, even when the live view motion picture is delayed, it is possible to capture an image of a scene desired by a user while watching the live view motion picture. Note that the effect recited herein is not necessarily limited, and may be any one of those recited in the specification.

MODE FOR CARRYING OUT THE INVENTION

Figure 1:
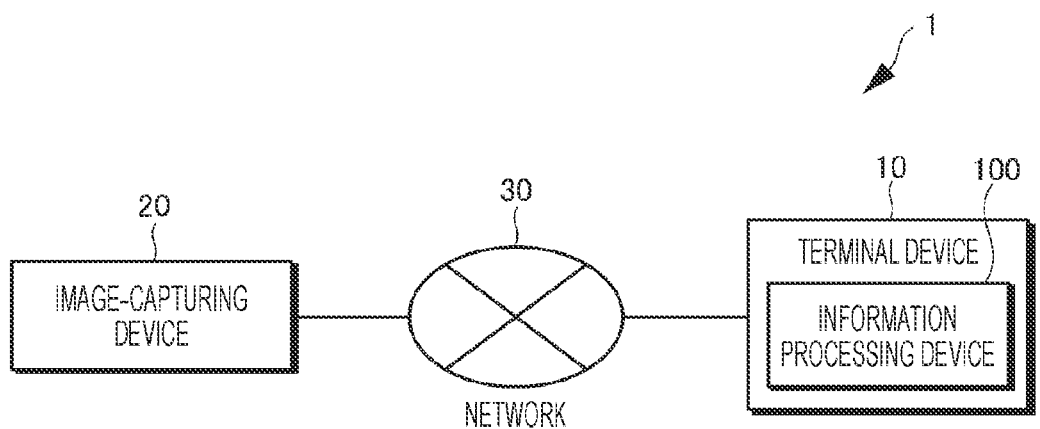
FIG. 1 is a block diagram illustrating a configuration of a camera system.

In the following, an embodiment of the present technology will be described with reference to the drawings. Note that the description will be provided in the following order.

<1. Embodiment>
[1-1. Configuration of Camera System]
[1-2. Configuration of Terminal Device]
[1-3. Configuration of Mark Setting User Interface]
[1-4. Configuration of Information Processing Device]
[1-5. Processing in Information Processing Device]
[1-6. Image-Capturing Method Using Marks]
<2. Modified Examples>
[2-1. Mark Setting by Subject Detection]
[2-2. Mark Movement Following Subject]
[2-3. Utilization of Camera Platform]
[2-4. Other Modified Examples]

1. EMBODIMENT 1-1. Configuration of Camera System

First, a configuration of a camera system 1 will be described with reference to FIG. 1. The camera system 1 includes a terminal device 10 and an image-capturing device 20, and the terminal device 10 and the image-capturing device 20 are connected via a network 30.

The present technology is used in remote image-capturing using the image-capturing device 20 and the terminal device 10. In the remote image-capturing, a live view motion picture captured by the image-capturing device 20 is transmitted to the terminal device 10 via the network 30 and displayed on the terminal device 10. Then, a user provides an image-capturing command (shutter input) to the terminal device 10 while watching the live view motion picture, and an input signal corresponding to the shutter input is transmitted to the image-capturing device 20 through the network 30, thereby performing image-capturing. Note that a distance between the terminal device 10 and the image-capturing device 20 may be any distance degree as far as communication can be performed.

The image-capturing device 20 is a camera capable of capturing still images and moving images, has a network connecting function, and is capable of performing image-capturing under control of an external device.

The terminal device 10 is a personal computer, a laptop computer, a tablet terminal, a smartphone, or the like having a network connecting function. The terminal device 10 includes a function as an information processing device 100.

The information processing device 100 actuates in the terminal device 10 and performs: display control on a mark setting user interface and an image-capturing user interface according to the present technology; and display control for a captured image and a live view motion picture transmitted from the image-capturing device 20 connected to the network 30. Furthermore, the information processing device 100 sets, for example: a mark indicating image-capturing start timing (hereinafter referred to as an image-capturing start mark S); a mark indicating image-capturing end timing (hereinafter referred to as an image-capturing end mark E) in an image-capturing scene; and the like.

The image-capturing start mark S and the image-capturing end mark E are set on the basis of a captured image and a live view motion picture acquired by capturing an image of a similar scene prior to capturing an image of an image-capturing scene. Accordingly, a user needs to capture the image in the similar scene prior to capturing the image in the image-capturing scene.

In a case where an image-capturing object is, for example, a goal scene in a car race and an image-capturing scene is a final lap of the race, a similar scene is obtained by capturing an image of a lap prior to the final lap, capturing an image of a different race performed prior to the race at which an image is to be captured in an image-capturing scene, or the like. Furthermore, in a case where an image-capturing object is a goal scene of athletic sports such as a 100-meter sprint or the like, a similar scene is obtained by, for example, capturing an image of a preliminary 100-meter sprint performed prior to image-capturing for the 100-meter sprint at which an image is to be captured in an image-capturing scene. Moreover, in a case where an image-capturing object is image-capturing along a script, such as a movie or the like, a similar image is obtained by, for example, capturing an image of a rehearsal prior to a real performance that is an image-capturing scene.

For convenience of the description, an image-capturing object is a car race in the present embodiment, continuous shooting image-capturing is started from a time point at which a subject car reaches a goal line that is a target position until a time point a few seconds after the car crosses the goal line. Accordingly, an image-capturing start mark S indicates timing to start the continuous shooting image-capturing in an image-capturing scene, and an image-capturing end mark E indicates timing to end the continuous shooting image-capturing in the image-capturing scene.

The network 30 may be any network as far as data can be exchanged via wired communication, a wireless local area network (LAN), a wide area network (WAN), a wireless fidelity (WiFi), a 4th generation mobile communication system (4G), the Bluetooth (registered trademark), infrared communication, and the like.

1-2. Configuration of Terminal Device

Figure 2:
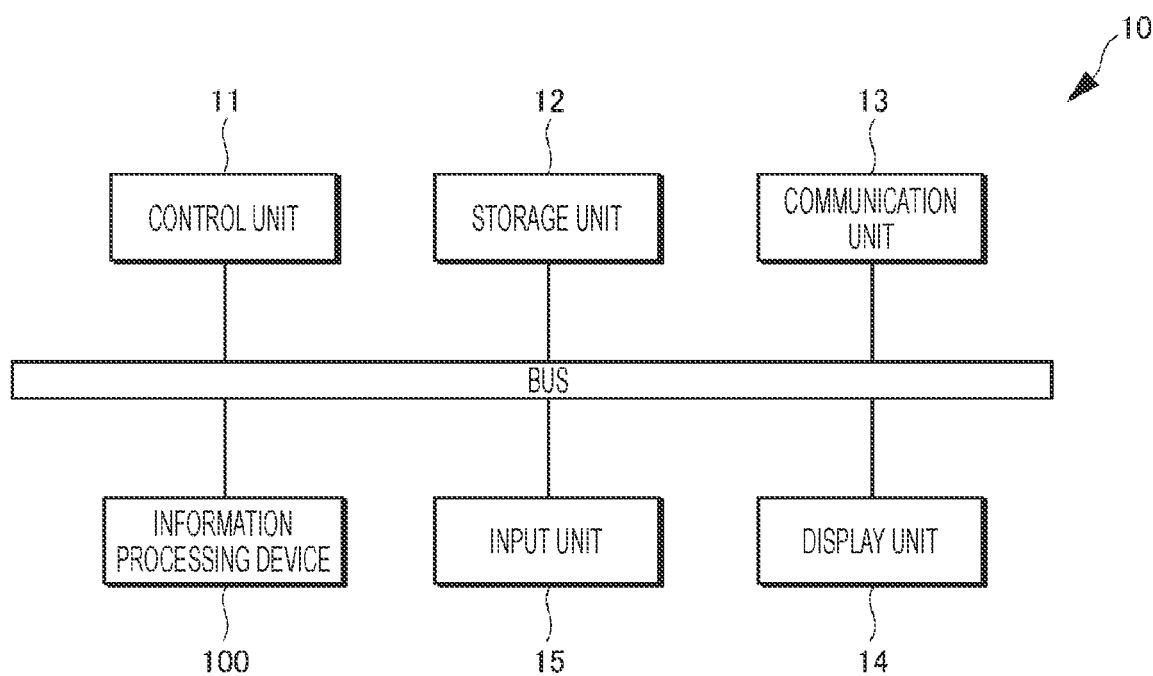
FIG. 2 is a block diagram illustrating a configuration of a terminal device.

Next, the terminal device 10 will be described with reference to FIG. 2. The terminal device 10 includes a control unit 11, a storage unit 12, a communication unit 13, a display unit 14, an input unit 15, and the information processing device 100.

The control unit 11 includes a central processing unit (CPU), a random access memory (RAM), a read only memory (ROM), and the like. The ROM stores a program to be read and executed by the CPU, and the like. The RAM is used as a work memory of the CPU. The CPU executes various kinds of processing in accordance with the program stored in the ROM, and performs control for the entire terminal device 10 by issuing commands.

The storage unit 12 is, for example, a large-capacity storage medium such as a hard disk, an SD memory card, or the like. The storage unit 12 can store: content including captured image, a captured motion picture, etc. captured by the image-capturing device 20; applications, and the like.

The communication unit 13 includes a communication module, a communication connector, and the like to communicate with the image-capturing device 20, other devices, the Internet, and the like via the network 30. Communication by the communication unit 13 can be either wired communication such as USB communication or the like, or wireless communication such as a wireless LAN like Wi-Fi, the Bluetooth (registered trademark), ZigBee, the 4th generation mobile communication system (4G), etc.

The display unit 14 is a display device including, for example, a liquid crystal display (LCD), a plasma display panel (PDP), an organic electro luminescence (EL) panel, or the like. The display unit 14 displays a user interface of the terminal device 10, a captured image stored in the storage unit 12, the content such as a captured motion picture, the mark setting user interface, the image-capturing user interface, and the like according to the present technology.

The input unit 15 receives operation input to the terminal device 10 from a user. When input is made to the input unit 15 from the user, an input signal corresponding to the input is generated and output to the control unit 11. Then, the control unit 11 performs arithmetic processing and controls the terminal device 10 in accordance with the input signal. The input unit 15 includes a touch panel integrated with the display unit 14, a pointing device, a keyboard, a mouse, and the like, and the pointing device is operated by touching, with a finger, a plate-shaped sensor called a track pad or a touch pad and not integrated with the display unit 14.

1-3. Configuration of Mark Setting User Interface

Next, a configuration of the mark setting user interface 200 displayed on the display unit 14 of the terminal device 10 will be described with reference to FIGS. 3 to 5. The mark setting user interface 200 includes an image display portion 201, a first frame display portion 202, a second frame display portion 203, a live view display portion 204, a live view frame rate input portion 205, an image-capturing frame rate input portion 206, and a shutter button 207.

On the image display portion 201, continuously-captured images acquired by continuous shooting image-capturing by the image-capturing device 20 are displayed in time series. In examples of FIGS. 3 and 4, the continuously-captured images are displayed in time sequence order from top to bottom. Note that the image display portion 201 includes, for example, a means like a scroll bar 208 that adjusts a display range, and in a case where the number of the plurality of captured images cannot be fitted within one screen, captured images to be displayed thereon can be changed by scrolling the scroll bar 208 up and down. The captured images displayed on the image display portion 201 are images captured by continuous shooting at a frame rate that has been input and set at the image-capturing frame rate input portion 206.

Figure 4:
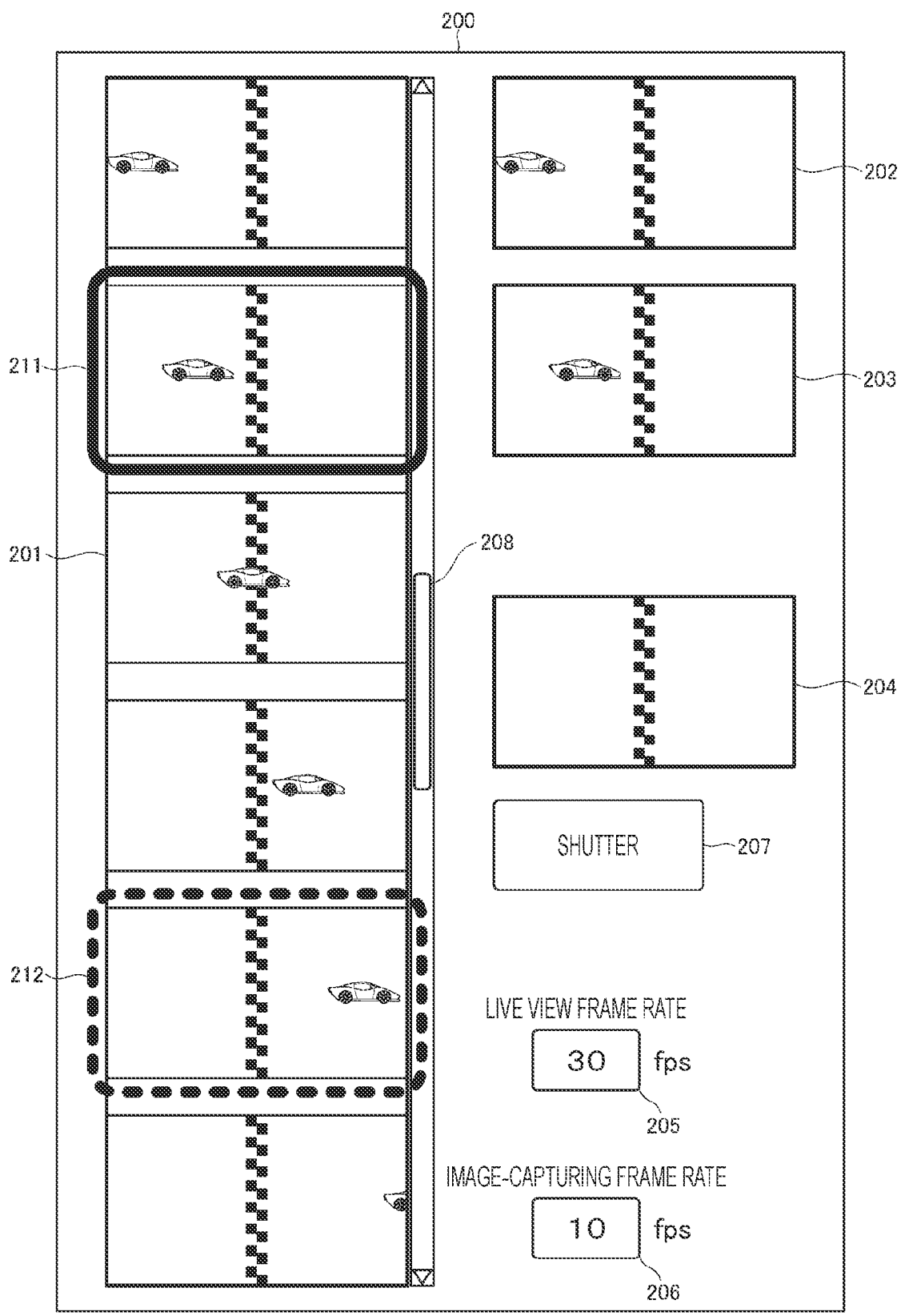
FIG. 4 is a diagram illustrating the configuration of the mark setting user interface.

As illustrated in FIG. 4, a first selection frame 211 that is provided for a user to select an image-capturing start image is displayed in a manner superimposed on the image display portion 201. The image-capturing start image is a captured image corresponding to timing at which the user desires to start the continuous shooting image-capturing in an image-capturing scene. For example, as illustrated in FIG. 4, in a case of desiring to start the continuous shooting image-capturing from a time point at which a car reaches a goal line, a captured image at the time point at which the car reaches the goal line is selected as the image-capturing start image. The user can select, from among the plurality of captured images displayed on the image display portion 201, the image-capturing start image by shifting the first selection frame 211.

Furthermore, as illustrated in FIG. 4, a second selection frame 212 that is provided for a user to select an image-capturing end image is displayed in a manner superimposed on the image display portion 201. The image-capturing end image is a captured image corresponding to timing at which the user desires to end the continuous shooting image-capturing in the image-capturing scene. The user can select, from among the plurality of captured images displayed on the image display portion 201, the image-capturing end image by shifting the second selection frame 212. Each of the image-capturing start image and the image-capturing end image is an image-capturing timing image in the scope of claims.

Note that, in FIG. 4, the first selection frame 211 and the second selection frame 212 are distinguished by shape differences such as a solid line and a broken line, but the distinguishment can also be made by other shape differences, color differences, shade differences, or the like.

A frame corresponding to the image-capturing start image selected by the first selection frame 211 from among frames constituting a live view motion picture transmitted from the image-capturing device 20 is displayed on the first frame display portion 202. The frames constituting the live view motion picture are frame images, and a live view image in the scope of the claims is a frame image constituting this live view motion picture. The live view motion picture from the image-capturing device 20 is delayed from an actual state of an image-capturing object due to a transmission time in the network 30, or the like. Accordingly, a frame displayed on the first frame display portion 202 is also delayed from the actual state of the image-capturing object. A method of obtaining a frame corresponding to an image-capturing start image will be described later.

A frame corresponding to the image-capturing end image selected by the second selection frame 212 from among the frames constituting the live view motion picture transmitted from the image-capturing device 20 is displayed on the second frame display portion 203. The live view motion picture from the image-capturing device 20 is delayed from an actual state of the image-capturing object due to the transmission time in the network 30, or the like. Accordingly, the frame displayed on the second frame display portion 203 is also delayed from the actual state of the image-capturing object. A method of obtaining a frame corresponding to the image-capturing end image will be described later.

The live view display portion 204 displays a live view motion picture captured by the image-capturing device 20 and transmitted to the terminal device 10 via the network 30.

The live view frame rate input portion 205 is provided for a user to input a frame rate of the live view motion picture acquired and transmitted by the image-capturing device 20 during image-capturing in a similar scene. The user can set the frame rate of the live view motion picture by inputting a desired frame rate value in the live view frame rate input portion 205.

The image-capturing frame rate input portion 206 is provided for a user to input a continuous shooting frame rate for a plurality of continuous captured images captured in the continuous shooting image-capturing and displayed on the image display portion 201 by the image-capturing device 20 in image-capturing in a similar scene. The user can set, by inputting a desired frame rate value in the image-capturing frame rate input portion 206, the frame rate of the continuous shooting image-capturing by the image-capturing device 20.

The shutter button 207 is a software button for a user to provide the image-capturing device 20 with an image-capturing command in the terminal device 10 not including a shutter button as a hardware button generally provided in a camera. When input is made to the shutter button 207 by the user, an input signal corresponding to the input is generated and transmitted to the image-capturing device 20 via the network 30. The image-capturing device 20 that has received the input signal performs image-capturing, thereby acquiring a captured image. Note that, when an input state to the shutter button 207 is continued, the image-capturing device 20 performs the continuous shooting image-capturing during continuation of the input state, and when the input to the shutter button 207 is ended, the image-capturing device 20 ends the continuous shooting image-capturing. The captured images captured by the image-capturing device 20 on the basis of the input to the shutter button 207 are displayed on the image display portion 201. Note that the shutter button 207 may be implemented not only by such a software button but also by assigning a shutter function to a hardware button included in the terminal device 10.

The mark setting user interface 200 has the above-described configuration.

Next, a method in which a user inputs an image-capturing start mark S and an image-capturing end mark E by using the mark setting user interface 200 will be described. FIG. 5 is a diagram illustrating the first frame display portion 202, the second frame display portion 203, and the live view display portion 204 excerpted from the mark setting user interface 200 for the description.

The image-capturing start mark S is set in accordance with user input to the first frame display portion 202. For example, when the user makes input at a position on the first frame display portion 202 where the user desires to set the image-capturing start mark S by making the input with a mouse, a touch panel, or the like provided as the input unit 15 of the terminal device 10, the image-capturing start mark S is set and displayed there.

Figure 3:
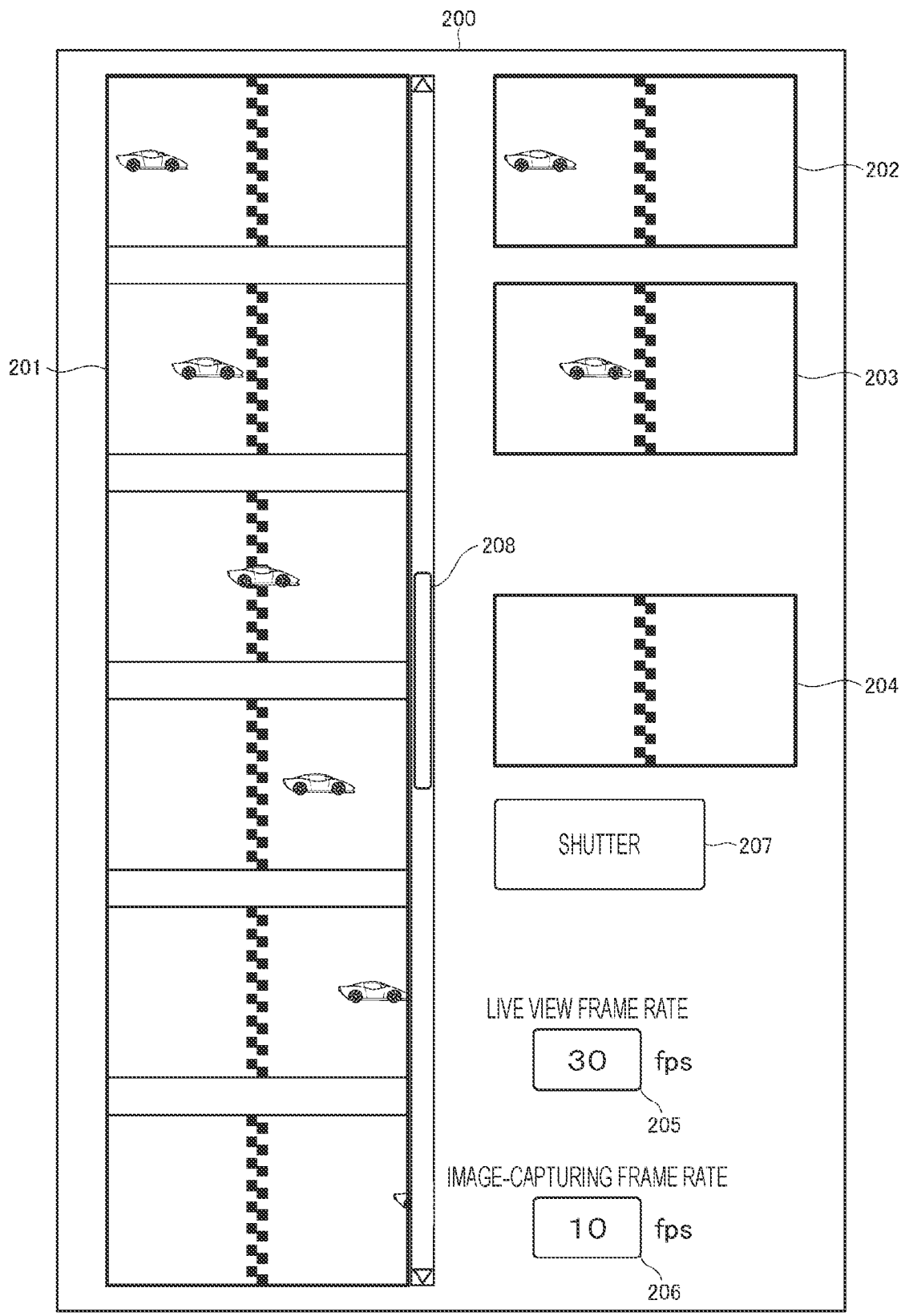
FIG. 3 is a diagram illustrating a configuration of a mark setting user interface.
Figure 5:
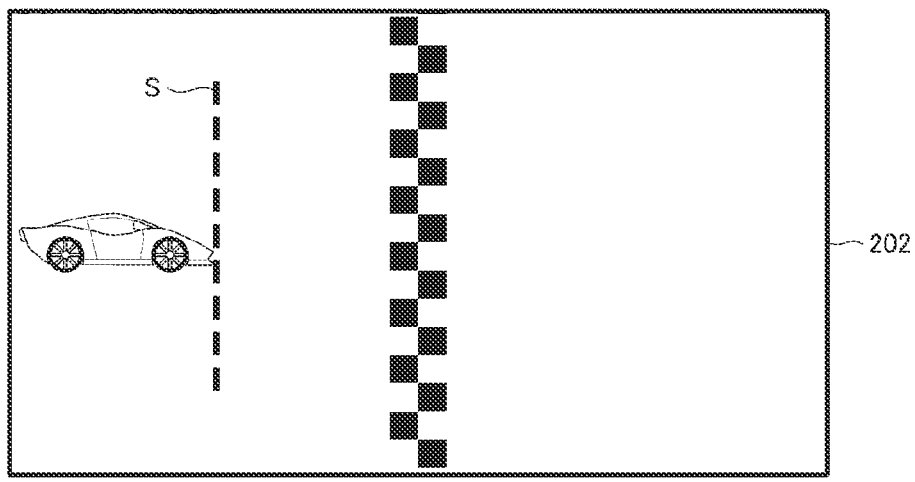
FIG. 5 is a diagram illustrating a part of the mark setting user interface.
Figure 5:
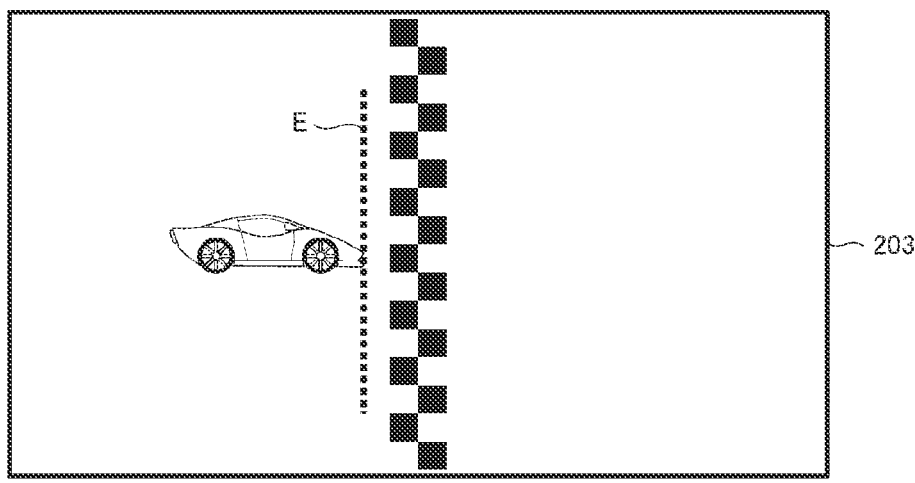
Figure 5:
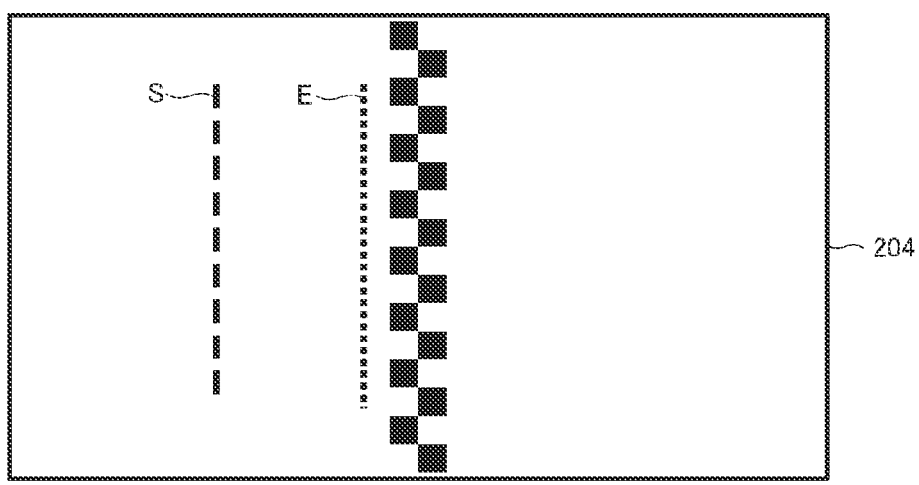

In the examples illustrated in FIGS. 3 to 5, the user desires to start continuous shooting image-capturing from a state in which a car reaches a goal line, and therefore, a captured image in the state in which the car reaches the goal line is selected as an image-capturing start image, and the image-capturing start mark S is set at a front end of the car in a traveling direction in a frame corresponding to the image-capturing start image.

Furthermore, an image-capturing end mark E is set in accordance with user input to the second frame display portion 203. For example, when the user makes input at a position on the second frame display portion 203 where the user desires to set the image-capturing end mark E by making the input with the mouse, the touch panel, or the like provided as the input unit 15, the image-capturing end mark E is set and displayed there.

Note that the position of the image-capturing start mark S can be adjusted in the first frame display portion 202 by performing dragging with mouse operation, touch panel operation, or the like. Similarly, the position of the image-capturing end mark E can be adjusted in the second frame display portion 203 by performing dragging with the mouse operation, the touch panel operation, or the like. Further-more, the position can also be finely adjusted by operation with the keyboard provided as the input unit 15 of the terminal device 10.

When the image-capturing start mark S is set, the image-capturing start mark S is displayed, on the live view display portion 204, at the position same as that in the first frame display portion 202. Furthermore, similarly, when the image-capturing end mark E is set, the image-capturing end mark E is displayed, on the live view display portion 204, at the position same as that in the second frame display portion 203.

Thus, the user can set the image-capturing start mark S and the image-capturing end mark E by using the mark setting user interface 200.

1-4. Configuration of Information Processing Device

Figure 6:
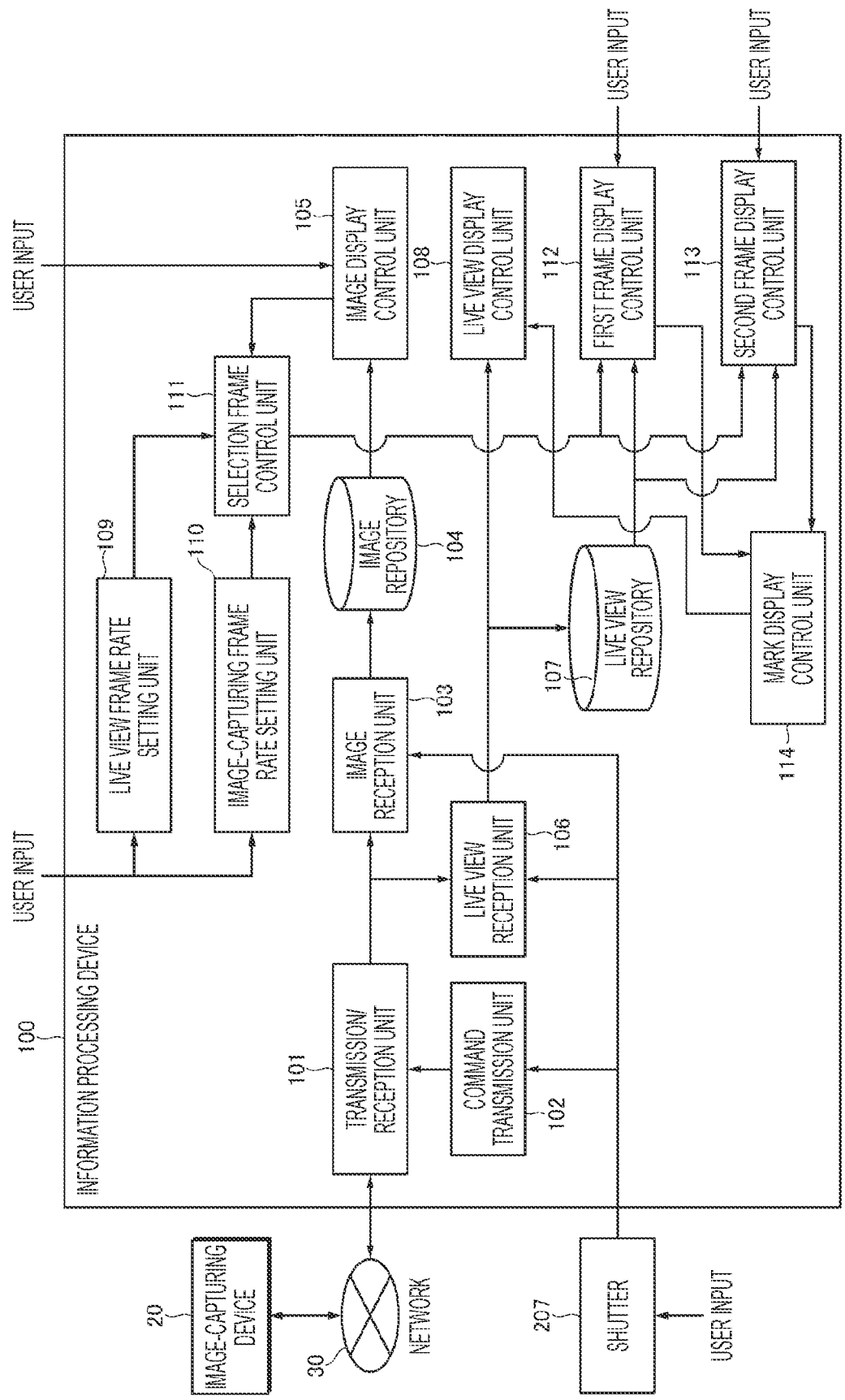
FIG. 6 is a block diagram illustrating a configuration of an information processing device.

Next, a configuration of the information processing device 100 will be described with reference to FIG. 6.

The information processing device 100 includes a transmission/reception unit 101, a command transmission unit 102, an image reception unit 103, an image repository 104, an image display control unit 105, a live view reception unit 106, a live view repository 107, a live view display control unit 108, a live view frame rate setting unit 109, an image-capturing frame rate setting unit 110, a selection frame control unit 111, a first frame display control unit 112, a second frame display control unit 113, and a mark display control unit 114.

The transmission/reception unit 101 receives data transmitted from the image-capturing device 20 via the network 30. Furthermore, the transmission/reception unit 101 performs processing of transmitting a command received from the command transmission unit 102 to the image-capturing device 20 via the network 30.

The command transmission unit 102 converts, into a command, an input signal generated by input made to the shutter button 207 from a user, and supplies the command to the transmission/reception unit 101.

The image reception unit 103 extracts captured images from the data supplied from the image-capturing device 20 via the transmission/reception unit 101, and stores the captured images in the image repository 104 while assigning numbers to the captured images in a manner such that an image captured earlier is assigned with a smaller number. Furthermore, the image reception unit 103 receives supply of the input signal corresponding to the input to the shutter button 207, determines an input state to the shutter button 207, and in a case where the input is made, the captured images stored in the image repository 104 are deleted.

The image repository 104 stores a plurality of captured images captured by continuous shooting image-capturing.

The image display control unit 105 causes the image display portion 201 of the mark setting user interface 200 to display, in accordance with the order of the numbers, the captured images stored in the image repository 104. Furthermore, the image display control unit 105 detects, from the captured images, a selected image-capturing start image and a selected image-capturing end image and supplies number information of each thereof to the selection frame control unit 111.

The live view reception unit 106 extracts, from the data supplied from the image-capturing device 20 via the transmission/reception unit 101, a live view motion picture including a plurality of frames, and supplies the live view motion picture to the live view display control unit 108 and the live view repository 107.

Furthermore, the live view reception unit 106 determines the input state to the shutter button 207 on the basis of the input signal corresponding to the input to the shutter button 207, and in a case where the input is made, frames stored in the live view repository 107 are deleted, and in a case where the input is continued, the live view reception unit 106 assigns numbers to frames constituting a live view and stores the frames in the live view repository 107, and when the input is ended, the live view reception unit 106 ends storage of the frames in the live view repository 107. Note that the numbers are assigned in a manner such that a frame of earlier time is assigned with a smaller value, and a frame of more recent time is assigned with a larger value.

The live view repository 107 stores the frames constituting the live view motion picture.

The live view display control unit 108 causes the live view display portion 204 of the mark setting user interface 200 to display the live view motion picture supplied from the live view reception unit 106.

The live view frame rate setting unit 109 holds a live view frame rate input to the live view frame rate input portion 205 from a user, and supplies the live view frame rate to the selection frame control unit 111.

The image-capturing frame rate setting unit 110 holds a continuous shooting frame rate of the continuous shooting image-capturing after the continuous shooting frame rate has been input to the image-capturing frame rate input portion 206 from the user, and supplies the continuous shooting frame rate to the selection frame control unit 111.

The selection frame control unit 111 calculates a live view frame number corresponding to image-capturing time of an image-capturing start image from: the live view frame rate; the continuous shooting frame rate; and the number assigned to the image-capturing start image.

Furthermore, the selection frame control unit 111 calculates a frame number (hereinafter, referred to as a live view frame number) that constitutes a live view corresponding to image-capturing time of an image-capturing end image from: the live view frame rate; the continuous shooting frame rate; and a number assigned to the image-capturing end image.

Here, a method of calculating a live view frame number will be described. Assuming that a number assigned to each of a plurality of captured images is n, the continuous shooting frame rate is sf, and image-capturing time of an initial captured image is 0, it is possible to calculate image-capturing time T(n) of a captured image having a number n by Expression 1 below.

$$T(n)=n\times(1/sf) \quad \text{[Expression 1]}$$

Furthermore, when the time of the initial live view frame is set as 0, a live view frame number Li at certain time t can be calculated by Expression 2 while defining a live view frame rate as Lf.

$$Li=t\times Lf \quad \text{[Expression 2]}$$

Note that, in a case where the calculated value is not an integer, the calculated value is rounded down or rounded up so as to be an integer because Li is a live view frame number.

Then, the live view frame number L(n) corresponding to a captured image having the number n can be calculated by Expression 3 below obtained from Expression 1 and Expression 2.

$$L(n)=T(n)\times Lf \quad \text{[Expression 3]}$$

With this Expression, a live view frame number corresponding to a captured image can be identified whatever a number of the captured image is.

Accordingly, assuming that, for example, a number of an image-capturing start image is s, a live view frame number corresponding thereto is to be a value equal to T(s) or less and has the closest time to the T(s), and therefore, L(s) is rounded down to the closest integer.

Furthermore, assuming that, for example, a number of an image-capturing start image is e, a live view frame number corresponding thereto is to be a value equal to T(e) or less and has the closest time to the T(e), and therefore, L(e) is rounded up to the closest integer.

The first frame display control unit 112 reads, from the live view repository 107, a frame constituting the live view motion picture corresponding to the image-capturing start image acquired from the selection frame control unit 111, and displays the frame on the first frame display portion 202 of the mark setting user interface 200. The live view motion picture from the image-capturing device 20 is delayed from an actual state of an image-capturing object due to a time required for motion picture encoding, a transmission time in the network 30, a time required for decoding in the terminal device 10, and the like. Accordingly, as illustrated in FIG. 4, the live view frame corresponding to the image-capturing start image thus displayed on the first frame display portion 202 is also delayed from the captured image and the actual state of the image-capturing object.

The second frame display control unit 113 reads, from the live view repository 107, a frame constituting the live view motion picture corresponding to the image-capturing end image acquired from the selection frame control unit 111, and displays the frame on the second frame display portion 203 of the mark setting user interface 200. The live view motion picture from the image-capturing device 20 is delayed from the actual state of the image-capturing object. Accordingly, as illustrated in FIG. 4, the live view frame corresponding to the number of the image-capturing end image thus displayed on the second frame display portion 203 is also delayed from the captured image and the actual state of the image-capturing object.

The mark display control unit 114 performs display control for the image-capturing start mark S and the image-capturing end mark E on the live view display portion 204 of the mark setting user interface 200. The first frame display control unit 112 receives input from a user and displays the image-capturing start mark S on the first frame display portion 202. The first frame display control unit 112 sets coordinates of the image-capturing start mark S in the mark display control unit 114. Furthermore, the second frame display control unit 113 receives input from the user and displays the image-capturing end mark E on the second frame display portion 203. The second frame display control unit 113 sets coordinates of the image-capturing end mark E in the mark display control unit 114. The mark display control unit 114 commands the live view display control unit 108 to display the marks on the live view display portion 204 on the basis of the set coordinates of the image-capturing start mark S and the set coordinates of the image-capturing start mark S. The live view display control unit 108 displays the image-capturing start mark S and the image-capturing start mark S in a manner superimposed on the live view displayed on the live view display portion 204 in accordance with the command from the mark display control unit 114.

The information processing device 100 has the configuration as described above. The information processing device 100 includes a program, and the program may be pre-installed inside the terminal device 10, or the program may be distributed by download, a storage medium, or the like so as to be installed by a user himself/herself. Moreover, the information processing device 100 may be implemented not only by the program but also by combination with a dedicated device, a dedicated circuit, and the like by hardware having the function.

1-5. Processing in Information Processing Device

Figure 7:
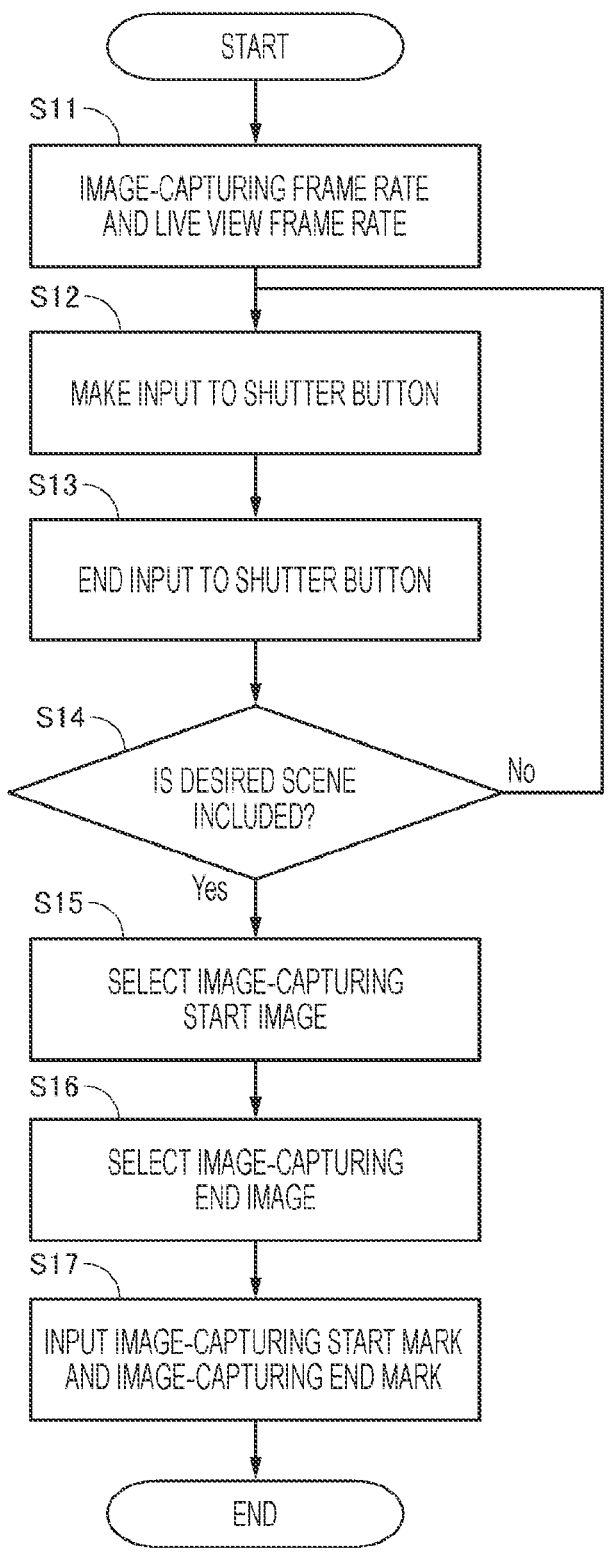
FIG. 7 is a flowchart illustrating a flow of user input for mark setting.
Figure 8:
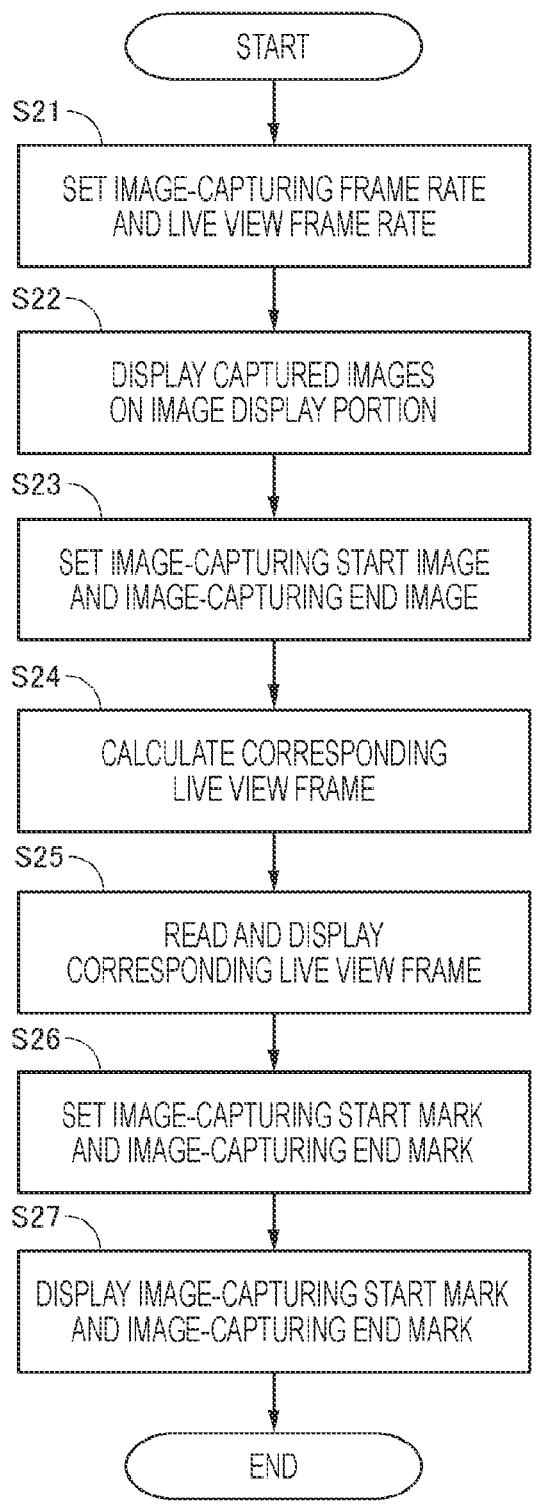
FIG. 8 is a flowchart illustrating a flow of mark setting processing.

Next, a flow of processing in the information processing device 100 will be described with reference to FIGS. 7 and 8. First, as a premise of the processing in the information processing device 100, a flow of user input operation for mark setting by the information processing device 100 will be described with reference to the flowchart of FIG. 7.

First, in step S11, the user makes input to the live view frame rate input portion 205 and the image-capturing frame rate input portion 206, thereby setting a frame rate of a live view in image-capturing in a similar scene and a frame rate of continuous shooting image-capturing in image-capturing in the similar scene.

Next, in step S12, the user makes input to the shutter button 207 of the image-capturing device 20 as the image-capturing in the similar scene, and ends the input to the shutter button 207 in step S13. Consequently, a plurality of captured images is acquired by the continuous image-capturing during continuation of the input to the shutter button 207.

When the user ends the image-capturing in the similar scene, the plurality of captured images is displayed on the image display portion 201, and therefore, the user confirms, in next step S14, the captured images displayed on the image display portion 201, and confirms whether or not a scene similar to a scene which user desires to capture in later image-capturing is included.

In a case where no scene similar to the scene desired to be captured is included, the user returns to step S12 and repeats steps S12 to S14 until a scene similar to the scene desired to be image-captured is included (No in step S14).

In a case where a scene similar to the scene desired to be captured in an image-capturing scene is included, the processing proceeds to step S15 (Yes in step S14), the user selects an image-capturing start image from among the plurality of picked-up images displayed on the image display portion 201. This selection is performed by selecting one of the plurality of picked-up images by using the first selection frame 211 as described above.

Next, in step S16, the user selects an image-capturing end image from among the plurality of picked-up images displayed on the image display portion 201. This selection is performed by selecting one of the plurality of picked-up images by using the second selection frame 212 as described above.

When the image-capturing start image and the image-capturing end image are selected by the user, a live view frame corresponding to the image-capturing start image is displayed on the first frame display portion 202, and a live view frame corresponding to the image-capturing end image is displayed on the second frame display portion 203. Then, in step 17, the user inputs an image-capturing start mark S and an image-capturing end mark E on the first frame display portion 202 and the second frame display portion 203.

The user needs to perform the above-described input operation for the mark setting by the information processing device 100.

Next, a flow of the processing in the information processing device 100 will be described with reference to a flowchart of FIG. 8.

First, in step S21, a user sets a live view frame rate in image-capturing in a similar scene and a continuous shooting frame rate in the image-capturing in the similar scene on the basis of input to each of the live view frame rate input portion 205 and the image-capturing frame rate input portion 206.

Next, in step S22, captured images transmitted from the image-capturing device 20 are received and displayed on the image display portion 201.

Next, in step S23, an image-capturing start image and an image-capturing end image are set on the basis of selection input from the user by using the first selection frame 211 and the second selection frame 212.

Next, in step S24, a live view frame corresponding to the image-capturing start image and a live view frame corresponding to the image-capturing end image are calculated. A calculation method is the method described in the configuration of the information processing device 100.

Next, in step S25, the live view frame corresponding to the image-capturing start image and the live view frame corresponding to the image-capturing end image are read from the live view repository 107 and displayed on the first frame display portion 202 and the second frame display portion 203, respectively.

Next, in step 26, the image-capturing start mark S and the image-capturing end mark E are set in accordance with input from the user. Then, in step S27, the image-capturing start mark S is displayed on the first frame display portion 202, the image-capturing end mark E is displayed on the second frame display portion 203, and both the image-capturing start mark S and the image-capturing end mark E are displayed on the live view display portion 204.

The mark setting processing is performed by the information processing device 100 as described above.

1-6. Image-Capturing Method Using Marks

Next, the image-capturing method using an image-capturing start mark S and an image-capturing end mark E set in the processing by the above-described information processing device 100 will be described. This image-capturing is image-capturing performed after image-capturing in a similar scene. Furthermore, this image-capturing is remote image-capturing performed by a user making shutter input to the terminal device 10 and transmitting an input signal to the image-capturing device 20 through the network 30 in a manner similar to the image-capturing in the similar scene.

Figure 9:
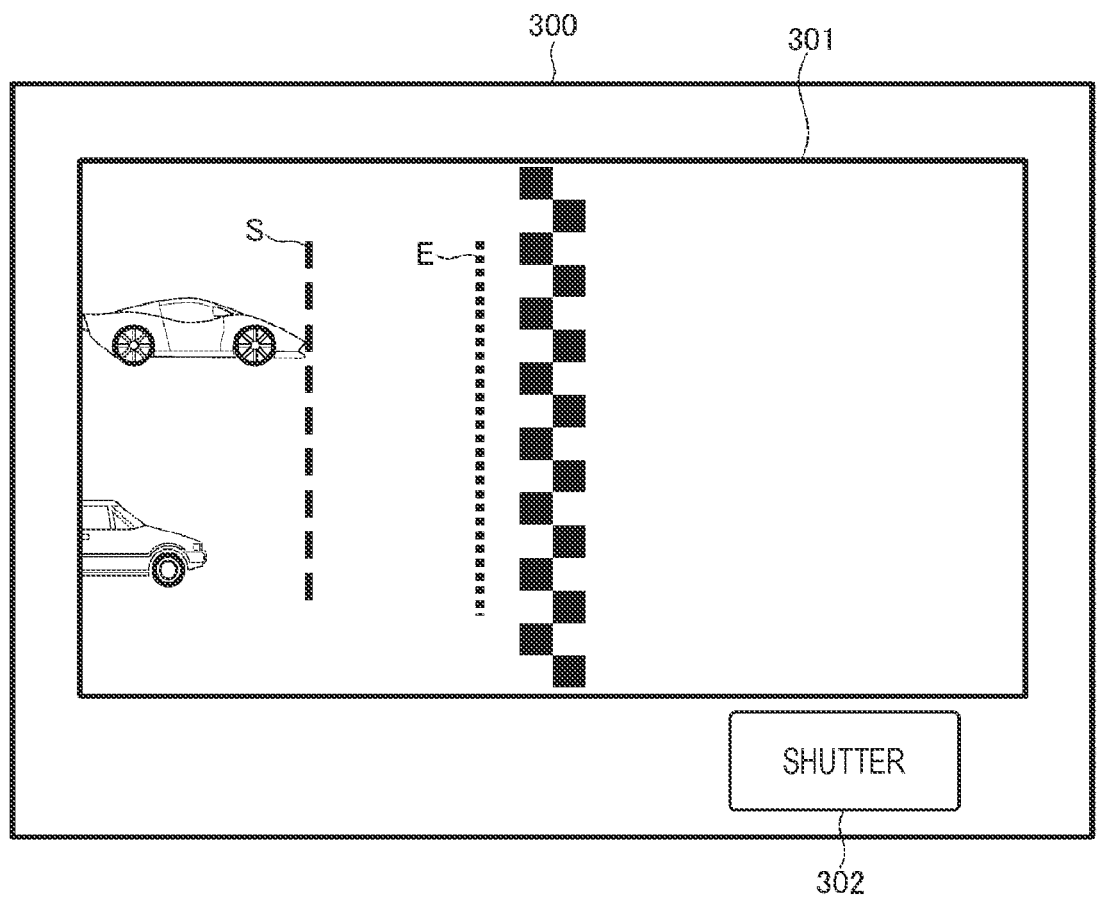
FIG. 9 is a diagram illustrating a configuration of an image-capturing user interface.

FIG. 9 is an example of an image-capturing user interface 300 displayed on the display unit 14 of the terminal device 10 in image-capturing after the image-capturing in the similar scene. The image-capturing user interface 300 includes a live view display portion 301 and a shutter button 302.

The live view display portion 301 displays a live view motion picture transmitted from the image-capturing device 20 via the network 30. This live view motion picture is delayed from an actual state of an image-capturing object due to an encoding time, a transmission time in the network 30, a decoding time, and the like. Furthermore, an image-capturing start mark S and an image-capturing end mark E are displayed on the live view display portion 301 in a manner superimposed on the live view motion picture. The image-capturing start mark S and the image-capturing end mark E are set in the mark setting user interface 200, and are displayed at positions same as those displayed on the live view display portion 204 of the mark setting user interface 200.

The shutter button 302 is a software button for a user to provide a command of image-capturing to the image-capturing device 20 in the terminal device 10 not including a shutter button as a hardware button. When input is made to the shutter button 302 from the user, a control signal corresponding to the input is generated and transmitted to the image-capturing device 20 via the network 30. The image-capturing device 20 that has received the control signal acquires a captured image by performing the image-capturing. Note that, when the input state to the shutter button 302 is continued, the image-capturing device 20 performs continuous shooting image-capturing during the continuation of the input state, and when the input to the shutter button 302 is ended, the image-capturing device 20 ends the continuous shooting image-capturing.

The image-capturing user interface 300 has the configuration as described above, and an image-capturing object includes scenes before and after a car as a subject reaches a goal line that is a target in a car race similar to that described for the mark setting user interface 200.

The live view display portion 301 continues displaying a real-time live view motion picture of the image-capturing object captured by the image-capturing device 20. When the user watches the live view display portion 301 and confirms that the car as the subject reaches the image-capturing start mark S, the user makes input to the shutter button 302. Then, upon confirmation of the fact that the car reaches the image-capturing end mark E, the user ends the input to the shutter button 302.

As described above, the live view motion picture is a motion picture delayed from an actual state of the image-capturing object. That is, the actual state of the image-capturing object is more advanced than a state in the live view motion picture. Accordingly, the input is made to the shutter button 302 at timing at which the car reaches the car position (reaches the image-capturing start mark S) in a frame of the live view motion picture corresponding to the image-capturing start image that is the "scene in which the car reaches the goal line" desired by the user, and as a result, the image-capturing can be started from a time point at which the car reaches the goal line.

Similarly, the input state to the shutter button 302 is ended at the timing at which the target subject reaches the image-capturing end mark E in the live view motion picture, and as a result, the image-capturing can be ended at the time point at which the car reaches a desired position.

As described above, creation of the marks and image-capturing utilizing the marks can be performed in the embodiment.

According to the present technology, even when the live view motion picture captured by the image-capturing device 20 is displayed on the terminal device 10 with a delay, an image of a scene desired by the user can be captured while watching the live view motion picture.

Furthermore, since there is no need to capture a large number of images including scenes before and after the desired scene in order to capture an image of the desired scene, the number of captured images can be reduced and complicated work of checking the captured images after the image-capturing can be eliminated.

2. MODIFIED EXAMPLES

While the embodiment of the present technology has been specifically described, the present technology is not limited to the above-described embodiment, and various kinds of modifications based on the technical idea of the present technology can be made.

2-1. Mark Setting by Subject Detection

In the embodiment, an image-capturing start mark S and an image-capturing end mark E are set on the basis of input from a user, but the information processing device 100 or the terminal device 10 may detect a subject and then set the marks on the basis of a detection result thereof.

Figure 10:
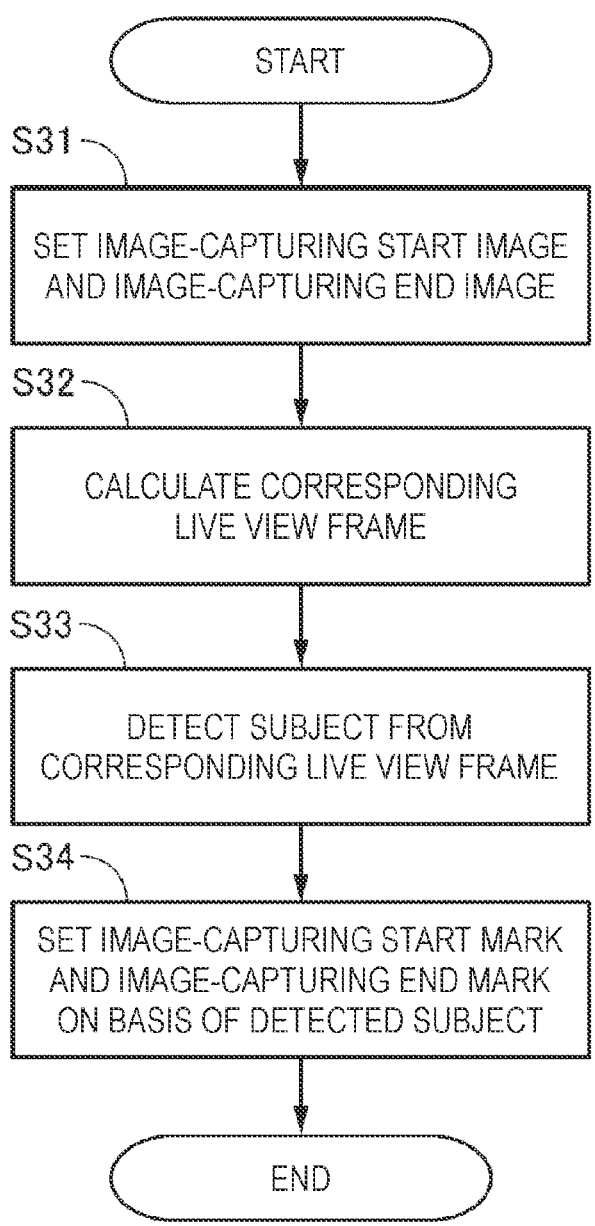
FIG. 10 is a flowchart illustrating processing of mark setting by subject detection.

Processing in the information processing device 100 in this case will be described with reference to the flowchart of FIG. 10.

First, in step S31, an image-capturing start image and an image-capturing end image are set on the basis of user input.

Next, in step S32, live view frame numbers corresponding to the image-capturing start image and a live view frame number corresponding to the image-capturing end image are calculated. The calculation method is similar to that in the embodiment.

Next, in step S33, subject detection processing is performed for a live view frame corresponding to the image-capturing start image. As the subject detection method, an object detection technology by template matching, a matching method based on luminance distribution information of the subject, a method based on a skin-color portion included in an image, a feature amount of a human face, or the like may be used. Furthermore, these methods may be combined so as to improve recognition accuracy.

Next, in step S34, the image-capturing start mark S is set on the basis of a position of the subject detected in the live view frame corresponding to the image-capturing start image. As a method of setting the image-capturing start mark S on the basis of the position of the subject, there are methods of alignment with a position of a front end of the detected subject in a traveling direction, alignment with a position of a rear end of the subject in the traveling direction, alignment with a center position of the subject, and the like. In a case where the mark is thus set by using, as the reference, the front end or the rear end in the traveling direction of the subject, or the like, it is preferable to perform movement detection of the subject and contour detection processing of the subject in addition to the subject detection processing. Furthermore, a region including the detected subject may be set as the image-capturing start mark S. Similarly, an image-capturing end mark E is set on the basis of a position of the subject detected in an image-capturing end live view frame.

As described above, the mark setting based on the subject detection result is performed. According to this method based on the subject detection, the user does not need to make input for the mark setting, and therefore, the marks can be set easily and quickly.

2-2. Mark Movement Following Subject

In the embodiment, the example of capturing an image of a situational scene in which a moving subject (car) reaches a fixed target (a goal line) has been exemplified, but the image-capturing object is not limited thereto. For example, like tennis illustrated in FIGS. 11A and 11B, there may be a situational scene in which a moving subject (ball B) reaches a moving target (tennis player P) (a situational scene in which the tennis player P hits the ball B).

In this case, since the target (tennis player P) moves, a distance between an image-capturing start mark S and the target (tennis player P) is constantly changed. Accordingly, when a position of the image-capturing start mark S is fixed, an image desired by a user cannot be constantly captured even though input is made to the shutter button 207 at a time point at which the subject (ball B) reaches the image-capturing start mark S.

Considering this, the image-capturing start mark S and the image-capturing end mark E are made to move (are redrawn) in a manner following changes in a position of a moving target, thereby enabling the image-capturing in accordance with the marks even though the target moves.

Figure 11A:
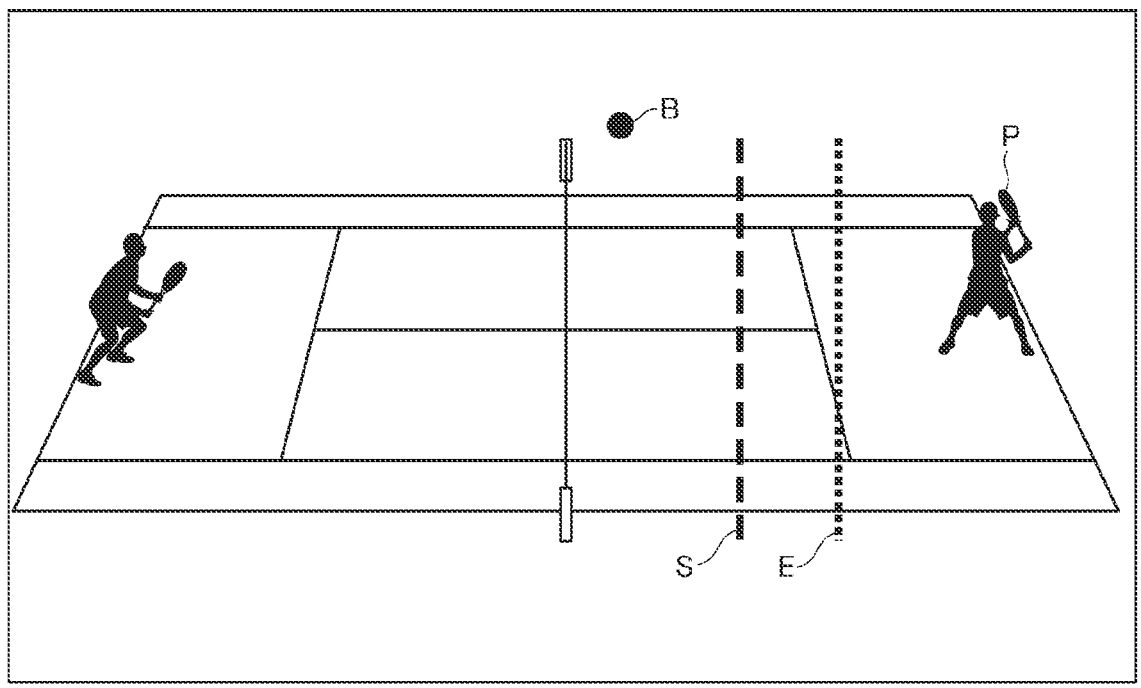
FIGS. 11A and 11B are explanatory diagrams of a modified example in which a mark moves following a subject.

A modified example thereof will be described with reference to FIGS. 11A and 11B. For example, as illustrated in FIG. 11A, in a case of performing image-capturing for a tennis match, assume that an image-capturing start mark S and an image-capturing end mark E are set by using a captured motion picture captured in a similar scene. A method of setting the image-capturing start mark S and the image-capturing end mark E is similar to that of the embodiment. In the example of FIG. 11A, assume that the image-capturing start mark S is set at a position three meters in front of the target (tennis player P).

In this case, a subject as a following target of the image-capturing start mark S (referred to as a following target subject) is set. In the example of FIGS. 11A and 11B, the target (tennis player P) is set as the following target subject. The following target subject may be set on the basis of user input or may be set by performing the subject detection processing. The similar applies to the image-capturing end mark E.

Figure 11B:
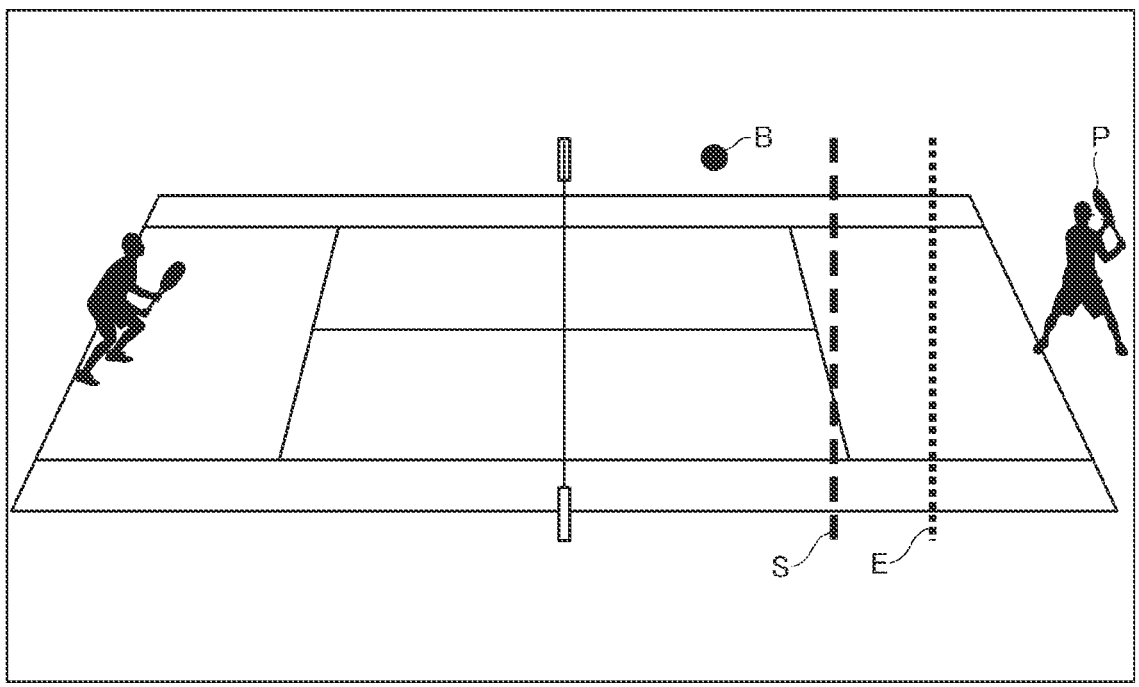

Then, in an image-capturing scene, when a live view motion picture is displayed on the image-capturing user interface 300, the following target subject is detected by subject detection, and the image-capturing start mark S and the image-capturing end mark E are made to move following movement of the following target subject as illustrated in FIG. 11B. As a result, a distance between the following target subject (tennis player P) and each of the image-capturing start mark S and the image-capturing end mark E becomes always constant wherever the following target subject (tennis player P) moves. Accordingly, wherever the following target subject (tennis player P) is positioned, input is made to the shutter button 207 at a time point at which the subject (ball B) reaches the image-capturing start mark S, and input is made to the shutter button 207 at a time point at which the ball B reaches the image-capturing end mark E, and as a result, it is possible to capture images before and after the situational scene in which the subject (ball B) reaches the target (tennis player P) (the situational scene in which the tennis player P hits the ball B).

2-3. Utilization of Camera Platform

Figure 12A:
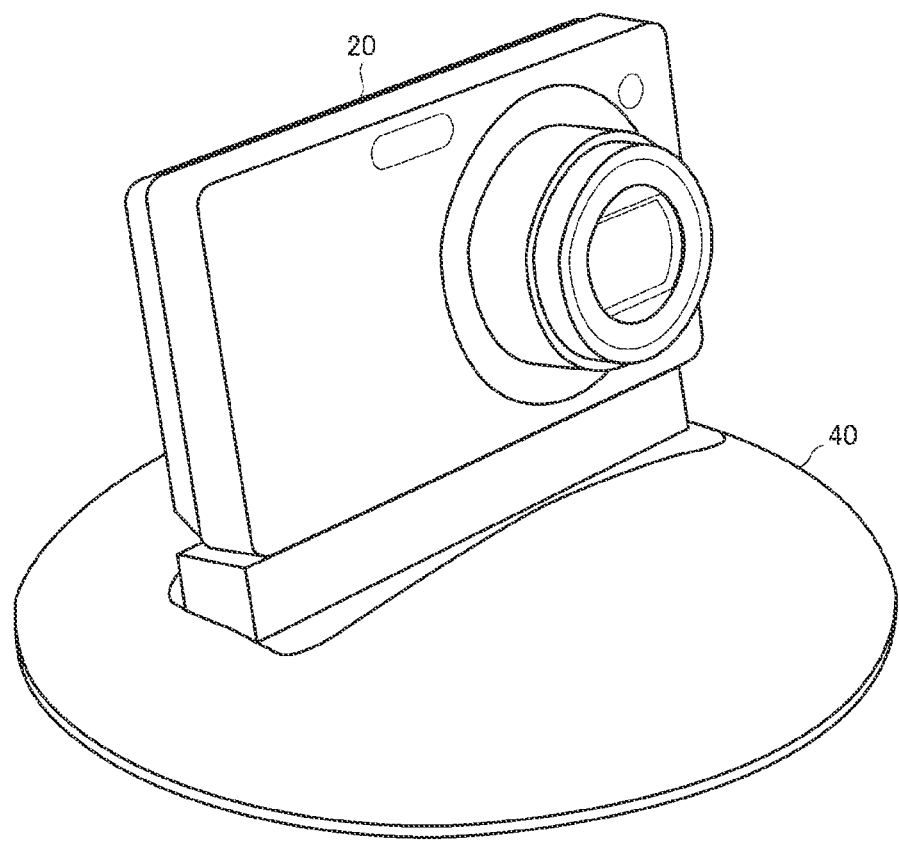
FIGS. 12A and 12B are diagrams illustrating a configuration of a modified example using a camera platform.

Furthermore, the present technology is not only applicable to a case where a user performs image-capturing while holding the image-capturing device 20 in his/her hands or a case where image-capturing is performed while fixing the image-capturing device 20 with a tripod or the like, but also applicable to a case where image-capturing is performed by mounting the image-capturing device 20 on a camera platform 40. As illustrated in FIG. 12A, the camera platform 40 is a device capable of automatically changing an image-capturing direction of the image-capturing device 20 by performing pan/tilt operation while supporting the image-capturing device 20.

Figure 12B:
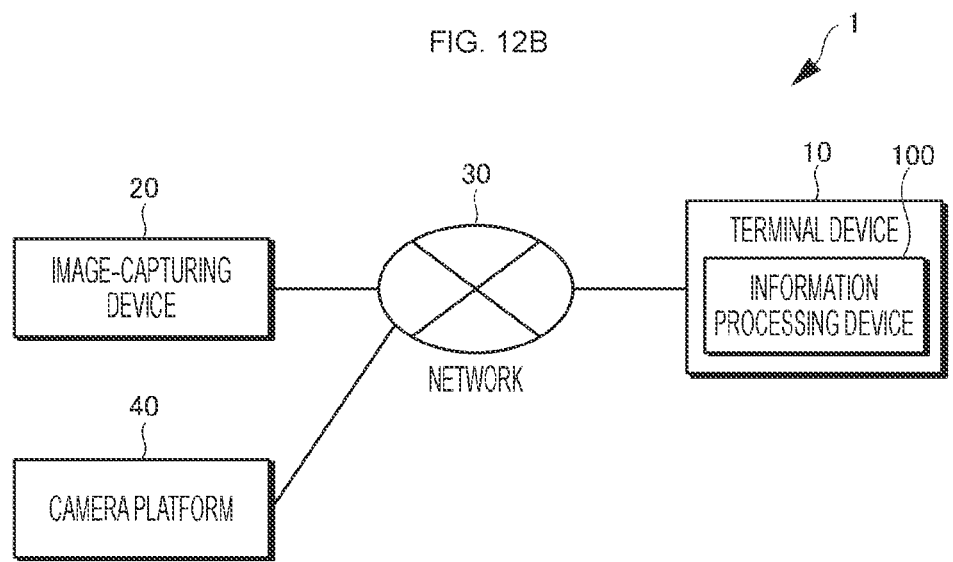

As illustrated in FIG. 12B, the camera platform 40 is connected to the network 30, has a control circuit (not illustrated), and can perform the pan/tilt operation in accordance with a control signal transmitted from the terminal device 10 via the network 30. With use of such a camera platform 40, the image-capturing direction of the image-capturing device 20 can be made to follow a moving direction of a subject in image-capturing using an image-capturing start mark S and an image-capturing end mark E.

Figure 13:
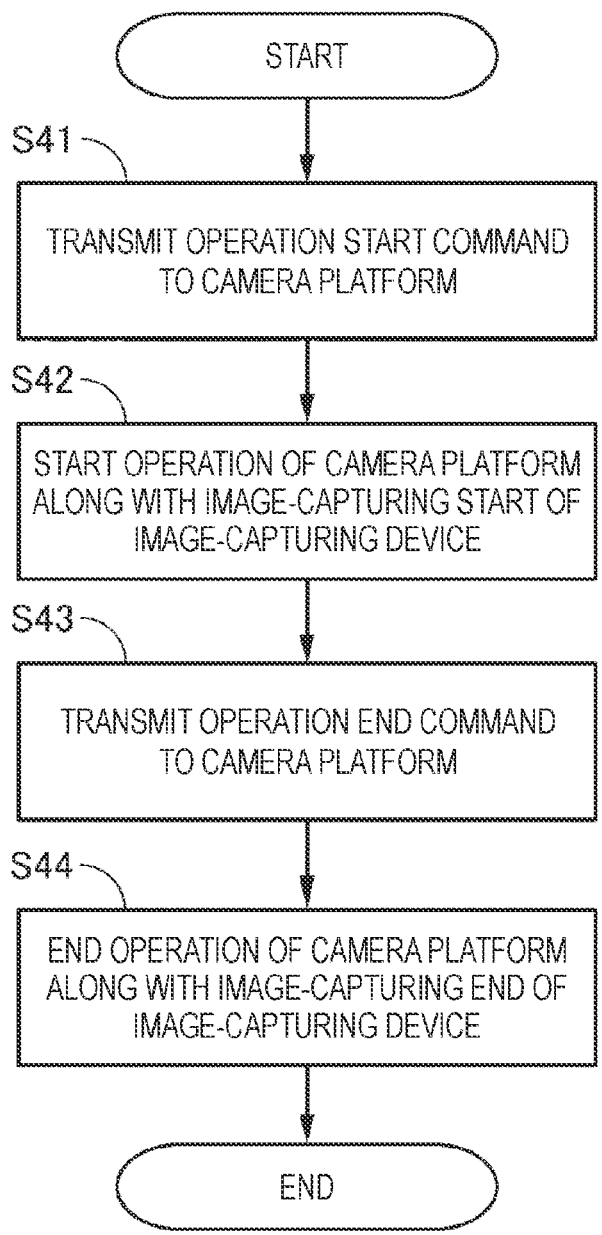
FIG. 13 is a flowchart illustrating processing in the modified example using the camera platform.

Control processing of the camera system 1 including the camera platform 40 will be described with reference to the flowchart of FIG. 13. First, in step S41, the information processing device 100 transmits an operation start command to the camera platform 40 simultaneously with transmitting, to the image-capturing device 20, an input signal corresponding to input to the shutter button 207.

Next, in step S42, the camera platform 40 starts the pan/tilt operation on the basis of the operation start command along with start of continuous shooting image-capturing by the image-capturing device 20.

After starting the operation of the camera platform 40, the information processing device 100 or the image-capturing device 20 detects a subject, and continues regularly transmitting operation commands to the camera platform 40 to perform pan/tilt control so as to follow the subject on the basis of detection results of the subject until end of the continuous shooting image-capturing. In response thereto, the camera platform 40 performs the pan/tilt operation so as to follow the subject.

Next, in step S43, the information processing device 100 transmits an operation end command to the camera platform 40 simultaneously with transmitting, to the image-capturing device 20, a signal corresponding to end of the input to the shutter button 207.

Then, in step S44, the image-capturing device 20 ends the continuous shooting image-capturing, and also the camera platform 40 ends the pan/tilt operation on the basis of the operation end command. Note that the camera platform 40 that has ended the pan/tilt operation may return to a state before starting the image-capturing.

2-4. Other Modified Examples

Figure 14:
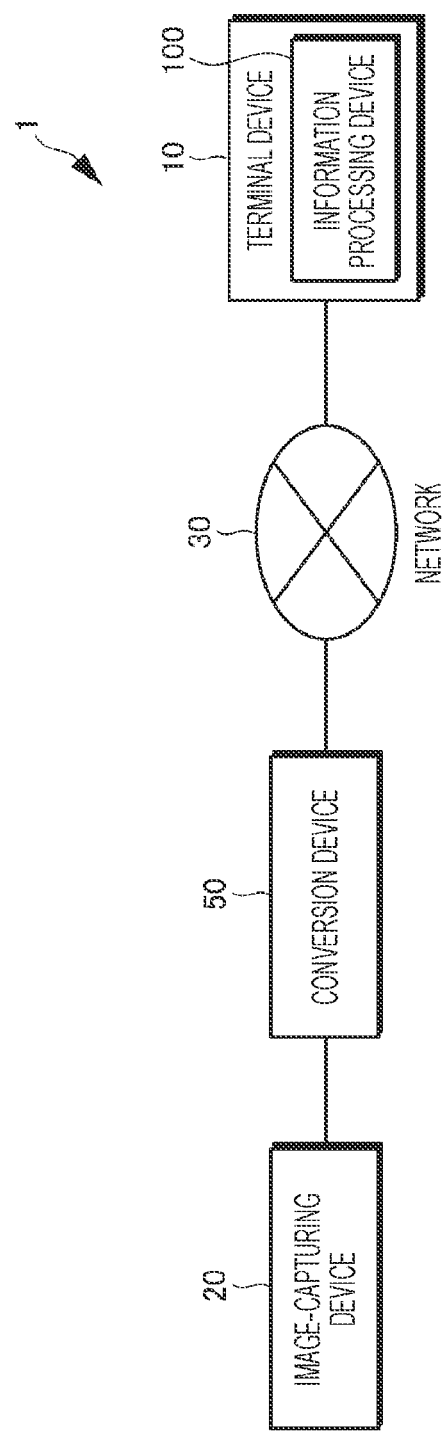
FIG. 14 is a block diagram illustrating a configuration of a modified example of a camera system.

The camera system 1 may have a configuration other than the configuration illustrated in FIG. 1. For example, in a case where the image-capturing device 20 does not include an interface that can be directly connected to the network 30, a conversion device 50 may be provided between the image-capturing device 20 and the network 30 as illustrated in FIG. 14, and the conversion device 50 converts, to an interface connectable to the network 30, an interface included in the image-capturing device 20.

Figure 15:
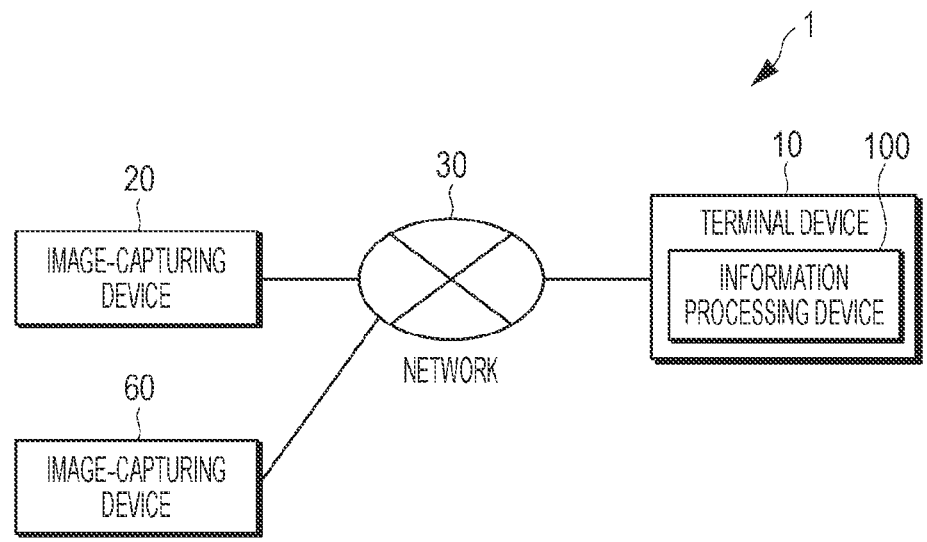
FIG. 15 is a block diagram illustrating a configuration of a modified example of a camera system.

Furthermore, as illustrated in FIG. 15, an image-capturing device for image-capturing in an image-capturing scene may be separated from an image-capturing device for live view image-capturing. In that case, the first image-capturing device 20 for an image-capturing scene and the second image-capturing device 60 for live view image-capturing are each required to be connected to the terminal device 10 via the network 30. In such a configuration, processing by the mark setting user interface 200 and the image-capturing user interface 300 are also similar to that of the embodiment. Furthermore, a terminal device used for mark creation and a terminal device used for real image-capturing may be different ones.

A motion picture in a similar scene may not be motion picture data of an event actually performed in front of the image-capturing device 20 but may be motion picture data stored in advance after ending image-capturing by a different image-capturing device, or the like.

The image-capturing device 20 may include a so-called lens-style camera that works with a smartphone, an in-vehicle camera, a camera mounted on a drone, a monitoring camera, a dark-vision camera, medical cameras such as an X-ray camera (X-ray photograph), a gastric camera (endoscope), and the like, an aerial camera, an underwater camera, etc. in addition to a digital camera and a digital single-lens reflex camera used by a general user.

Figure 16:
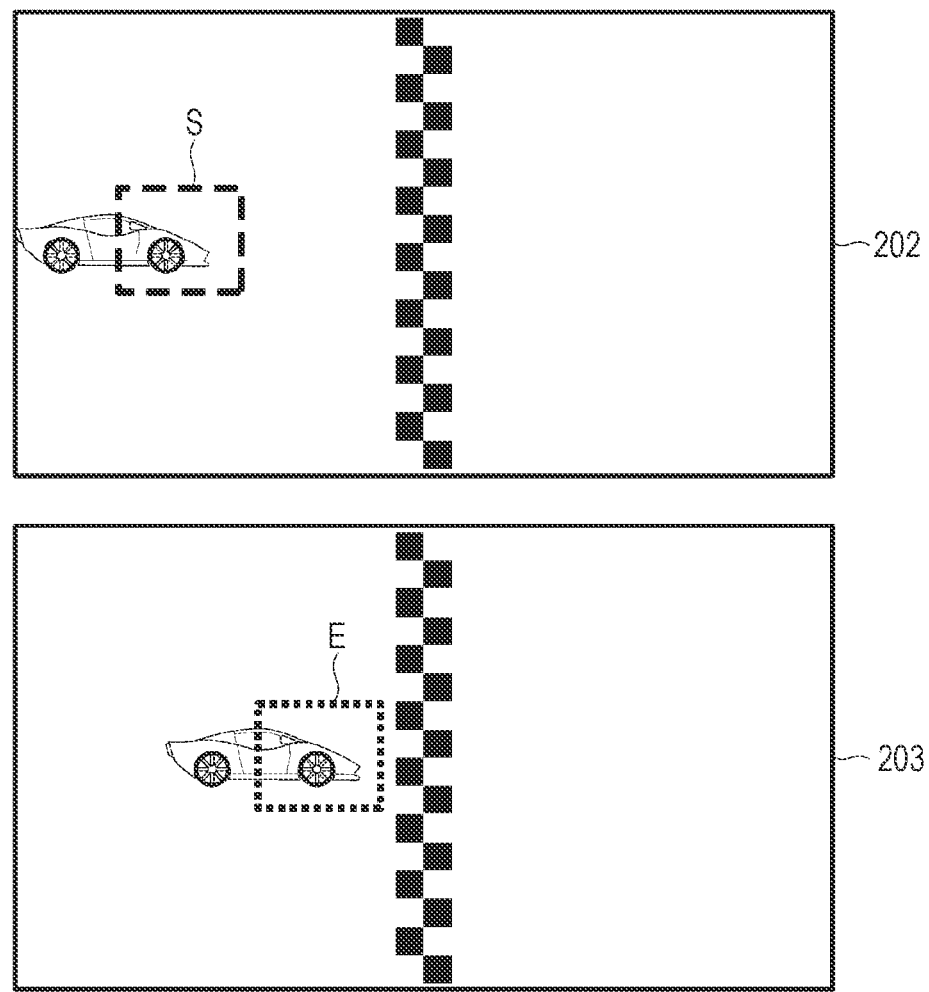
FIG. 16 is a diagram illustrating a modified example of the marks.

An image-capturing start mark S and an image-capturing end mark E are not limited to having linear shapes as illustrated in the embodiment, but may also have a square shape as illustrated in FIGS. 16A and 16B, or another shape, for example, a circular shape or the like.

Figure 17A:
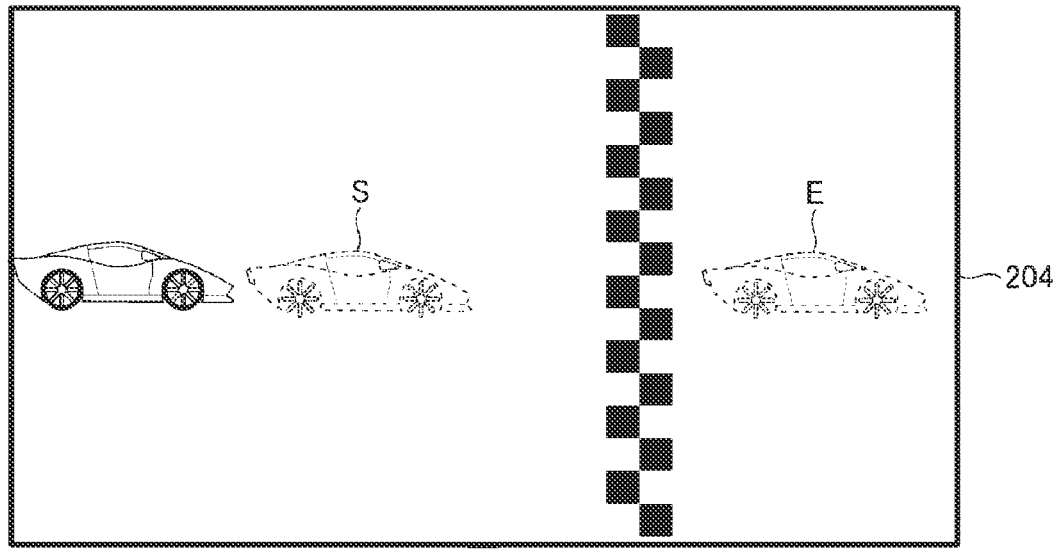
FIGS. 17A and 17B are diagrams illustrating a modified example of the marks.
Figure 17B:
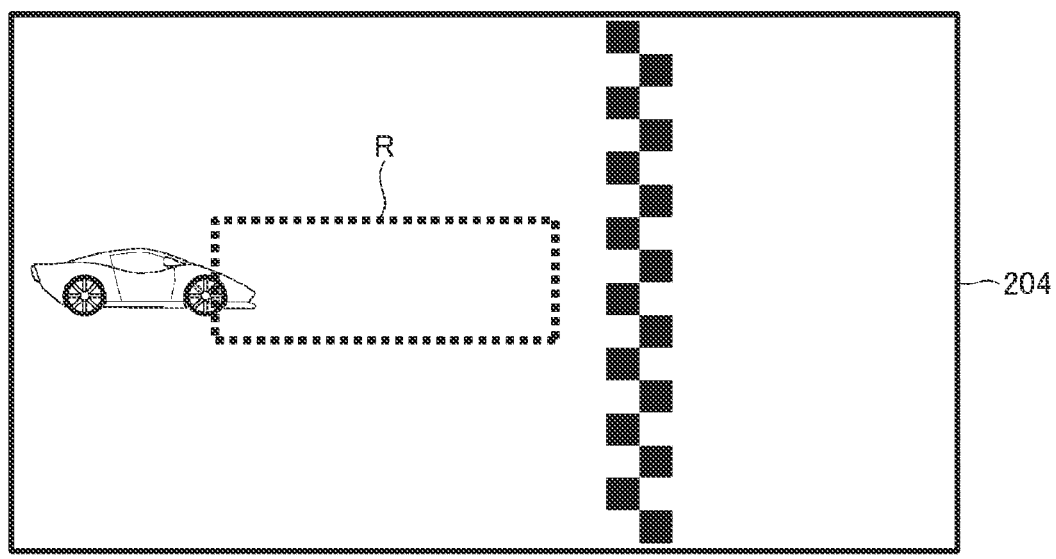

Furthermore, as illustrated in FIG. 17A, the image-capturing start mark S and the image-capturing end mark E may be overlap motion pictures of a subject captured in advance, or the like. Moreover, the image-capturing start mark S and the image-capturing end mark E may not be separated as different marks but may be set as a graphic R as illustrated in FIG. 17B, and continuous shooting may be continued while the subject is included inside the graphic R. In the case of FIG. 17B, one mark indicates image-capturing start timing and image-capturing end timing.

Furthermore, the continuous shooting image-capturing may be ended not only in response to a user releasing the input state to the shutter button 207 but also by another method. For example, a continuation time of the continuous shooting can be calculated from the continuous shooting frame rate and the number of captured images between an image-capturing start image and an image-capturing end image selected at the time of mark setting, and therefore, the continuous shooting can be ended when the continuation time of the continuous shooting has elapsed from image-capturing start time.

Figure 18:
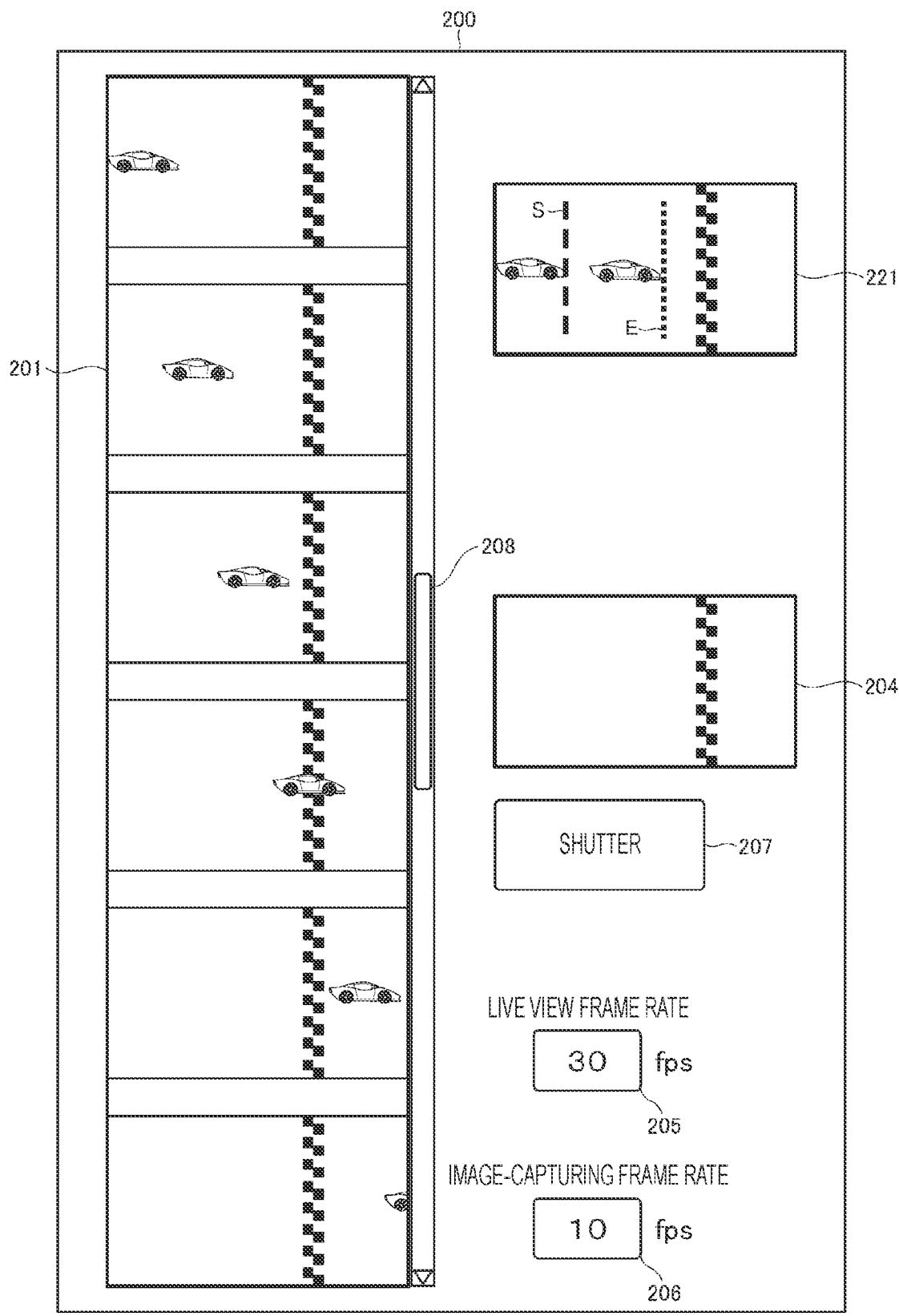
FIG. 18 is a diagram illustrating a modified example of the mark setting user interface.

Furthermore, in the mark setting user interface 200 in the embodiment, an image-capturing start mark S and an image-capturing end mark E are respectively set by: displaying, on the first frame display portion 202, a frame corresponding to the image-capturing start image selected by the first selection frame 211; and displaying, on the second frame display portion 203, a frame corresponding to the image-capturing end image selected by the second selection frame 212. However, as illustrated in FIG. 18, an image-capturing start mark S and an image-capturing end mark E may be set on one frame display portion 221 by displaying in an overlap manner a frame corresponding to the image-capturing start image and a frame corresponding to the image-capturing end image on the one frame display portion 221.

Furthermore, image-capturing is not necessarily performed by a user. A subject detecting function is provided in the information processing device 100 or the terminal device 10, and image-capturing may be automatically started when a detected subject reaches the image-capturing start mark S, and the image-capturing may be automatically ended when the detected subject reaches the image-capturing end mark E.

Figure 19:
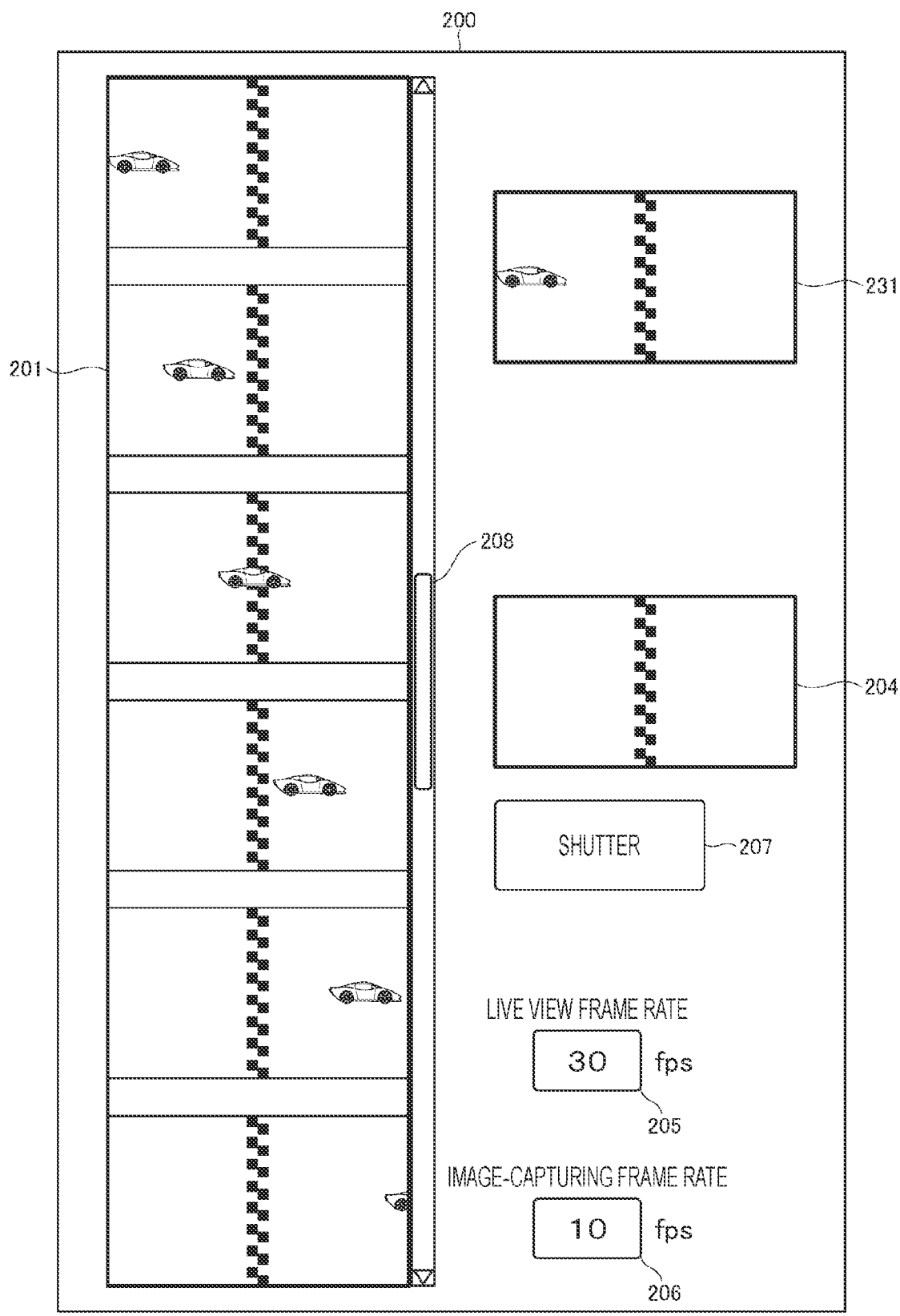
FIG. 19 is a diagram illustrating a modified example of the mark setting user interface.

Furthermore, the present technology can be applied not only to the continuous shooting image-capturing but also to single image-capturing. In a case of the single image-capturing, what is only required is to set a mark indicating image-capturing timing, and the marks for image starting and ending are not necessary. Accordingly, the mark setting user interface 200 becomes as illustrated in FIG. 19. The mark setting user interface 200 illustrated in FIG. 19 does not have the second frame display portion 203, and the user makes input to one frame display portion 231 in order to set an image-capturing timing mark. Setting the image-capturing timing mark is similar to setting an image-capturing start mark S in the embodiment. In this case, the image-capturing timing is timing to execute the image-capturing in the single image-capturing, and the mark indicates the timing to execute the image-capturing.

Furthermore, the present technology is not limited to a case where a subject of an image-capturing object moves linearly like in the vicinity of a goal line of a car race in the embodiment of the present technology, and the present technology can be applied to a subject that makes any kind of movement as far as the subject is determined to make movement having a predetermined track from one direction to another direction. Furthermore, a movement route may be curved.

The present technology may also adopt the following configurations.

(1)
An information processing device connected to an image-capturing device via a network, in which
a mark indicating image-capturing timing in an image-capturing scene is set on the basis of: a captured image of a scene similar to the image-capturing scene, the captured image being transmitted via the network; and a live view image corresponding to the captured image.

(2)
The information processing device recited in (1), in which the similar scene is a scene captured before the image-capturing scene.

(3)
The information processing device recited in (1) or (2), in which a frame constituting the live view image is displayed on a display unit, and the mark is set on the basis of input to the frame from a user.

(4)
The information processing device recited in (3), in which a plurality of images captured in the similar scene is displayed on the display unit, and an image-capturing timing image that indicates image-capturing timing in the image-capturing scene is set from among the plurality of images on the basis of the input from the user.

(5)
The information processing device recited in (4), in which the frame constituting the live view image displayed on the display unit is a frame corresponding to the image-capturing timing image.

(6)
The information processing device recited in (5), in which the frame corresponding to the image-capturing timing image is determined on the basis of: a frame rate of the live view image; and a frame rate of continuous image-capturing in which the plurality of images has been captured.

(7)
The information processing device recited in any one of (4) to (6), in which the image-capturing timing is image-capturing start timing in continuous shooting image-capturing, and the mark indicates timing to start the continuous shooting image-capturing in the image-capturing scene.

(8)
The information processing device recited in any one of (4) to (7), in which the image-capturing timing is image-capturing end timing in the continuous shooting image-capturing, and the mark indicates timing to end the continuous shooting image-capturing in the image-capturing scene.

(9)

The information processing device recited in any one of (1) to (8), in which the mark indicates timing to start continuous shooting image-capturing and timing to end the continuous shooting image-capturing in the image-capturing scene.

(10)

The information processing device recited in any one of (1) to (9), in which the image-capturing timing is timing to execute image-capturing in single image-capturing, and the mark indicates timing to execute image-capturing in the image-capturing scene.

(11)

The information processing device recited in any one of (3) to (10), in which the set mark is displayed on the display unit in a manner superimposed on the live view image.

(12)

The information processing device recited in any one of (1) to (11), in which the live view image is delayed from the captured image.

(13)

The information processing device recited in (12), in which the delay is caused by at least one of a time required for encoding in the image-capturing device, a transmission time in the network, or a time required for decoding in a device that displays the live view image.

(14)

The information processing device recited in any one of (1) to (13), in which the mark is displayed in a manner superimposed on a live view display in the image-capturing scene after the similar scene.

(15)

The information processing device recited in any one of (3) to (14), in which a subject in the frame is set as a following target subject, and the mark moves following the following target subject.

(16)

The information processing device recited in (15), in which the mark is displayed in a manner superimposed on a live view display in the image-capturing scene after the similar scene, and the mark moves following movement of the following subject.

(17)

The information processing device recited in any one of (1) to (16), in which the mark is set on the basis of a subject detection result in a frame constituting the live view image.

(18)

An information processing method including setting a mark indicating image-capturing timing in an image-capturing scene on the basis of: a captured image of a scene similar to the image-capturing scene, the captured image being transmitted via the network connected to an image-capturing device; and a live view image corresponding to the captured image.

(19)

An information processing program causing a computer to execute an information processing method including setting a mark indicating image-capturing timing in an image-capturing scene on the basis of: a captured image of a scene similar to the image-capturing scene, the captured image being transmitted via the network connected to an image-capturing device; and a live view image corresponding to the captured image.

REFERENCE SIGNS LIST

10 Terminal device
14 Display unit
20 image-capturing device
30 Network
100 Information processing device

The invention claimed is:

1. An information processing device, comprising:
circuitry configured to:
receive, from an image-capturing device via a network, a captured image of a scene similar to an image-capturing scene, wherein the captured image includes an image-capturing object in a first state;
determine a live view image corresponding to the captured image, wherein the live view image includes the image-capturing object in a second state delayed from the first state; and
set a mark indicating an image-capturing timing in the image-capturing scene based on the live view image corresponding to the captured image.

2. The information processing device according to claim 1, wherein the image-capturing device captures the captured image of the scene prior to capture of an image of the image-capturing scene.

3. The information processing device according to claim 1, wherein the circuitry is further configured to:
control a display unit to display a frame of the live view image; and
set the mark based on a first user input to the frame of the live view image.

4. The information processing device according to claim 3, wherein the circuitry is further configured to:
receive a plurality of captured images of the scene;
control the display unit to display the plurality of captured images that includes the captured image; and
set, based on a second user input, an image-capturing timing image that indicates the image-capturing timing in the image-capturing scene from among the plurality of captured images.

5. The information processing device according to claim 4, wherein the frame of the live view image is a frame corresponding to the image-capturing timing image.

6. The information processing device according to claim 5, wherein the circuitry is further configured to determine the frame corresponding to the image-capturing timing image based a frame rate of the live view image and a frame rate of continuous image-capturing of the plurality of captured images.

7. The information processing device according to claim 4, wherein the image-capturing timing is a timing to start continuous shooting image-capturing in the image-capturing scene.

8. The information processing device according claim 4, wherein the image-capturing timing is a timing to end continuous shooting image-capturing in the image-capturing scene.

9. The information processing device according to claim 4, wherein the image-capturing timing is a timing for execution of single image-capturing in the image-capturing scene.

10. The information processing device according claim 3, wherein the circuitry is further configured to control the display unit to display the set mark is in a manner superimposed on the live view image.

11. The information processing device according to claim 3, wherein the circuitry is further configured to:
seta subject in the frame of the live view image as a following target subject; and
move the mark based on the following target subject.

12. The information processing device according to claim 11, wherein
the image-capturing device captures an image in the image-capturing scene subsequent to capture of the captured image of the scene, and
the circuitry is further configured to:
control the display unit to display the mark in a manner superimposed on the image of the image-capturing scene; and
move the mark based on a movement of the following target subject.

13. The information processing device according to claim 1, wherein the mark indicating the image-capturing timing includes:
a timing to start continuous shooting image-capturing in the image-capturing scene, and
a timing to end the continuous shooting image-capturing in the image-capturing scene.

14. The information processing device according to claim 1, wherein the delay is based on at least one of an encoding time in the image-capturing device, a transmission time in the network, or a decoding time in a device that displays the live view image.

15. The information processing device according to claim 1, wherein
the image-capturing device captures an image of the image-capturing scene subsequent to capture of the captured image of the scene, and
the circuitry is further configured to control a display unit to display the mark in a manner superimposed on the image of the image-capturing scene.

16. The information processing device according to claim 1, wherein the circuitry is further configured to set the mark based a subject detection result in a frame of constituting the live view image.

17. An information processing method, comprising:
receiving, from an image-capturing device via a network, a captured image of a scene similar to an image-capturing scene, wherein the captured image includes an image-capturing object in a first state;
determining a live view image corresponding to the captured image, wherein the live view image includes the image-capturing object in a second state delayed from the first state; and
setting a mark indicating an image-capturing timing in the image-capturing scene based on the live view image corresponding to the captured image.

18. A non-transitory computer-readable medium having stored thereon, computer-executable instructions which, when executed by a computer, cause the computer to execute operations, the operations comprising:
receiving, from an image-capturing device via a network, a captured image of a scene similar to an image-capturing scene, wherein the captured image includes an image-capturing object in a first state;
determining a live view image corresponding to the captured image, wherein the live view image includes the image-capturing object in a second state delayed from the first state; and
setting a mark indicating an image-capturing timing in the image-capturing scene based on the live view image corresponding to the captured image.

19. An information processing device, comprising:
circuitry configured to:
receive, from an image-capturing device via a network, a plurality of captured images of a scene similar to an image-capturing scene;
control a display unit to display the plurality of captured images;
set, based on a first user input, an image-capturing timing image that indicates an image-capturing timing in the image-capturing scene from among the plurality of captured images;
determine a frame corresponding to the image-capturing timing image based on a frame rate of a live view image and a frame rate of continuous image-capturing of the plurality of captured images, wherein the frame corresponding to the image-capturing timing image is a frame of the live view image;
control the display unit to display the frame of the live view image; and
set a mark indicating the image-capturing timing in the image-capturing scene based on a second user input to the frame of the live view image.

* * * * *